United States Patent
Hasek

(10) Patent No.: US 8,990,869 B2
(45) Date of Patent: Mar. 24, 2015

(54) METHODS AND APPARATUS FOR CONTENT CACHING IN A VIDEO NETWORK

(71) Applicant: Time Warner Cable Enterprises LLC, New York, NY (US)

(72) Inventor: Charles A. Hasek, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 14/053,486

(22) Filed: Oct. 14, 2013

(65) Prior Publication Data

US 2014/0115090 A1 Apr. 24, 2014

Related U.S. Application Data

(62) Division of application No. 11/904,375, filed on Sep. 26, 2007, now Pat. No. 8,561,116.

(51) Int. Cl.
*H04N 7/173* (2011.01)
*H04L 29/06* (2006.01)
*H04L 29/08* (2006.01)

(52) U.S. Cl.
CPC ............ *H04L 65/60* (2013.01); *H04L 67/2823* (2013.01); *H04L 67/2842* (2013.01)
USPC .................. 725/92; 725/91; 725/94

(58) Field of Classification Search
CPC .......... H04N 21/231; H04N 21/23106; H04N 21/23113; H04N 21/23116
USPC .................. 725/91, 92, 93, 94, 95, 96, 97, 98
See application file for complete search history.

(56) References Cited

U.S. PATENT DOCUMENTS

| | | | |
|---|---|---|---|
| RE35,651 E | 11/1997 | Bradley et al. |
| 5,734,380 A | 3/1998 | Adams et al. |
| 5,793,410 A | 8/1998 | Rao |
| 5,815,662 A | 9/1998 | Ong |
| 6,105,134 A | 8/2000 | Pinder et al. |
| 6,124,878 A | 9/2000 | Adams et al. |
| 6,167,432 A | 12/2000 | Jiang |
| 6,175,856 B1 | 1/2001 | Riddle et al. |
| 6,216,152 B1 | 4/2001 | Wong et al. |
| 6,219,710 B1 | 4/2001 | Gray et al. |

(Continued)

FOREIGN PATENT DOCUMENTS

WO    WO 01/10125    2/2001

*Primary Examiner* — John Schnurr
(74) *Attorney, Agent, or Firm* — Gazdzinski & Associates, PC

(57) ABSTRACT

Methods and apparatus for selectively caching (and de-caching) video content in network so as to reduce content transformation requirements and also cache storage requirements. In one embodiment, a content caching controller associated with a content server differentiates content requests based on content attributes such as the requested codec format (e.g., MPEG or Windows Media), resolution, bitrate, and/or encryption type or security environment. If the content requested by a user is not available with the requested attribute(s), the content server transfers to content to the user by first transforming it. The content server also speculatively caches the transformed content locally, so that a future request for the same content with the same attributes can be filled by transferring without the intermediate transformation step. The controller allows the network operator to optimize use of available storage and transcoding resources.

20 Claims, 18 Drawing Sheets

(56) References Cited

U.S. PATENT DOCUMENTS

| | | |
|---|---|---|
| 6,252,964 B1 | 6/2001 | Wasilewski et al. |
| 6,256,393 B1 | 7/2001 | Safadi et al. |
| 6,337,715 B1 | 1/2002 | Inagaki et al. |
| 6,463,508 B1 | 10/2002 | Wolf et al. |
| 6,516,412 B2 | 2/2003 | Wasilewski |
| 6,594,699 B1 | 7/2003 | Sahai et al. |
| 6,651,103 B1 | 11/2003 | Markowitz et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,745,245 B1 | 6/2004 | Carpenter |
| 6,772,435 B1 | 8/2004 | Thexton |
| 6,799,196 B1 | 9/2004 | Smith |
| 6,868,439 B2 | 3/2005 | Basu et al. |
| 6,948,183 B1 | 9/2005 | Peterka |
| 6,961,430 B1 | 11/2005 | Gaske et al. |
| 6,985,934 B1 | 1/2006 | Armstrong et al. |
| 7,010,801 B1 | 3/2006 | Jerding |
| 7,024,461 B1 | 4/2006 | Janning |
| 7,027,460 B2 | 4/2006 | Iyer et al. |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,058,387 B2 | 6/2006 | Kumar |
| 7,089,577 B1 | 8/2006 | Rakib |
| 7,093,272 B2 | 8/2006 | Shah-Nazaroff et al. |
| 7,103,906 B1 | 9/2006 | Katz et al. |
| 7,107,462 B2 | 9/2006 | Fransdonk |
| 7,127,619 B2 | 10/2006 | Unger et al. |
| 7,133,837 B1 | 11/2006 | Barnes, Jr. |
| 7,174,385 B2 | 2/2007 | Li |
| 7,178,161 B1 | 2/2007 | Fristoe |
| 7,181,010 B2 | 2/2007 | Russ |
| 7,194,756 B2 | 3/2007 | Addington |
| 7,200,788 B2 | 4/2007 | Hiraki |
| 7,203,940 B2 | 4/2007 | Barmettler |
| 7,216,265 B2 | 5/2007 | Hughes |
| 7,225,164 B1 | 5/2007 | Candelore |
| 7,225,458 B2 | 5/2007 | Klauss |
| 7,254,608 B2 | 8/2007 | Yeager et al. |
| 7,257,650 B2 | 8/2007 | Muciesowicz |
| 7,266,198 B2 | 9/2007 | Medvinsky |
| 7,266,611 B2 | 9/2007 | Jabri |
| 7,266,726 B1 | 9/2007 | Ladd |
| 7,305,691 B2 | 12/2007 | Cristofalo |
| 7,325,073 B2 | 1/2008 | Shao et al. |
| 7,370,120 B2 | 5/2008 | Kirsch |
| 7,376,386 B2 | 5/2008 | Phillips et al. |
| 7,403,618 B2 | 7/2008 | Van Rijnsoever et al. |
| 7,434,245 B1 | 10/2008 | Shiga et al. |
| 7,602,820 B2 | 10/2009 | Helms |
| 7,617,516 B2 | 11/2009 | Huslak et al. |
| 7,690,020 B2 | 3/2010 | Lebar |
| 7,757,251 B2 | 7/2010 | Gonder |
| 8,170,065 B2 | 5/2012 | Hasek et al. |
| 2002/0019984 A1 | 2/2002 | Rakib |
| 2002/0032754 A1 | 3/2002 | Logston et al. |
| 2002/0049980 A1 | 4/2002 | Hoang |
| 2002/0053082 A1 | 5/2002 | Weaver et al. |
| 2002/0059619 A1 | 5/2002 | Lebar |
| 2002/0100059 A1 | 7/2002 | Buehl et al. |
| 2002/0147771 A1 | 10/2002 | Traversat et al. |
| 2002/0152299 A1 | 10/2002 | Traversat et al. |
| 2002/0162109 A1 | 10/2002 | Shteyn |
| 2002/0196939 A1 | 12/2002 | Unger et al. |
| 2003/0021412 A1 | 1/2003 | Candelore et al. |
| 2003/0025832 A1 | 2/2003 | Swart et al. |
| 2003/0056217 A1 | 3/2003 | Brooks |
| 2003/0074565 A1 | 4/2003 | Wasilewski et al. |
| 2003/0088876 A1 | 5/2003 | Mao et al. |
| 2003/0095791 A1 | 5/2003 | Barton et al. |
| 2003/0118014 A1 | 6/2003 | Iyer et al. |
| 2003/0135860 A1 | 7/2003 | Dureau |
| 2003/0161473 A1 | 8/2003 | Fransdonk |
| 2003/0217365 A1 | 11/2003 | Caputo |
| 2004/0045030 A1 | 3/2004 | Reynolds et al. |
| 2004/0103437 A1 | 5/2004 | Allegrezza et al. |
| 2004/0123313 A1 | 6/2004 | Koo et al. |
| 2004/0181800 A1 | 9/2004 | Rakib et al. |
| 2004/0187150 A1 | 9/2004 | Gonder |
| 2004/0193648 A1 | 9/2004 | Lai et al. |
| 2004/0193704 A1 | 9/2004 | Smith |
| 2004/0261114 A1 | 12/2004 | Addington et al. |
| 2004/0261116 A1 | 12/2004 | Mckeown et al. |
| 2004/0267965 A1 | 12/2004 | Vasudevan et al. |
| 2005/0039206 A1 | 2/2005 | Opdycke |
| 2005/0050160 A1 | 3/2005 | Upendran et al. |
| 2005/0060758 A1 | 3/2005 | Park |
| 2005/0071669 A1 | 3/2005 | Medvinsky et al. |
| 2005/0071882 A1 | 3/2005 | Rodriguez et al. |
| 2005/0097598 A1 | 5/2005 | Pedlow et al. |
| 2005/0108529 A1 | 5/2005 | Juneau |
| 2005/0114900 A1 | 5/2005 | Ladd |
| 2005/0125528 A1 | 6/2005 | Burke et al. |
| 2005/0135476 A1 | 6/2005 | Gentric et al. |
| 2005/0289618 A1 | 12/2005 | Hardin |
| 2006/0010075 A1 | 1/2006 | Wolf |
| 2006/0020984 A1 | 1/2006 | Ban et al. |
| 2006/0036750 A1 | 2/2006 | Ladd |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0073843 A1 | 4/2006 | Aerrabotu et al. |
| 2006/0084417 A1 | 4/2006 | Melpignano et al. |
| 2006/0085824 A1 | 4/2006 | Bruck |
| 2006/0088063 A1 | 4/2006 | Hartung et al. |
| 2006/0130107 A1 | 6/2006 | Gonder |
| 2006/0130113 A1 | 6/2006 | Carlucci |
| 2006/0133398 A1 | 6/2006 | Choi et al. |
| 2006/0133644 A1 | 6/2006 | Wells et al. |
| 2006/0171390 A1 | 8/2006 | La Joie |
| 2006/0218601 A1 | 9/2006 | Michel |
| 2006/0218604 A1 | 9/2006 | Riedl |
| 2006/0248553 A1 | 11/2006 | Mikkelson et al. |
| 2006/0256376 A1 | 11/2006 | Hirooka |
| 2006/0271946 A1 | 11/2006 | Woundy |
| 2006/0291506 A1 | 12/2006 | Cain |
| 2007/0022459 A1 | 1/2007 | Gaebel |
| 2007/0047449 A1 | 3/2007 | Berger |
| 2007/0053293 A1 | 3/2007 | McDonald et al. |
| 2007/0061818 A1 | 3/2007 | Williams |
| 2007/0076728 A1 | 4/2007 | Rieger |
| 2007/0094691 A1 | 4/2007 | Gazdzinski |
| 2007/0101157 A1 | 5/2007 | Faria |
| 2007/0121678 A1 | 5/2007 | Brooks |
| 2007/0124781 A1 | 5/2007 | Casey et al. |
| 2007/0130581 A1 | 6/2007 | Del Sesto |
| 2007/0153820 A1 | 7/2007 | Gould |
| 2007/0156539 A1 | 7/2007 | Yates |
| 2007/0162927 A1 | 7/2007 | Ramaswamy et al. |
| 2007/0204300 A1 | 8/2007 | Markley |
| 2007/0204311 A1 | 8/2007 | Hasek |
| 2007/0204314 A1 | 8/2007 | Hasek |
| 2007/0217436 A1 | 9/2007 | Markley |
| 2007/0241176 A1 | 10/2007 | Epstein et al. |
| 2007/0250880 A1 | 10/2007 | Hainline |
| 2007/0271386 A1 | 11/2007 | Kurihara et al. |
| 2008/0022012 A1 | 1/2008 | Wang |
| 2008/0066112 A1 | 3/2008 | Bailey |
| 2008/0098212 A1 | 4/2008 | Helms et al. |
| 2008/0098446 A1 | 4/2008 | Seckin et al. |
| 2008/0134156 A1 | 6/2008 | Osminer |
| 2008/0134165 A1 | 6/2008 | Anderson |
| 2008/0152316 A1 | 6/2008 | Sylvain |
| 2008/0155059 A1 | 6/2008 | Hardin et al. |
| 2008/0201748 A1 | 8/2008 | Hasek |

(56) References Cited

U.S. PATENT DOCUMENTS

| | | |
|---|---|---|
| 2008/0235746 A1 | 9/2008 | Peters |
| 2008/0273591 A1 | 11/2008 | Rieger |
| 2009/0028182 A1 | 1/2009 | Brooks |
| 2010/0223491 A1 | 9/2010 | Ladd et al. |
| 2012/0278841 A1 | 11/2012 | Hasek et al. |
| 2013/0325870 A1 | 12/2013 | Rouse et al. |

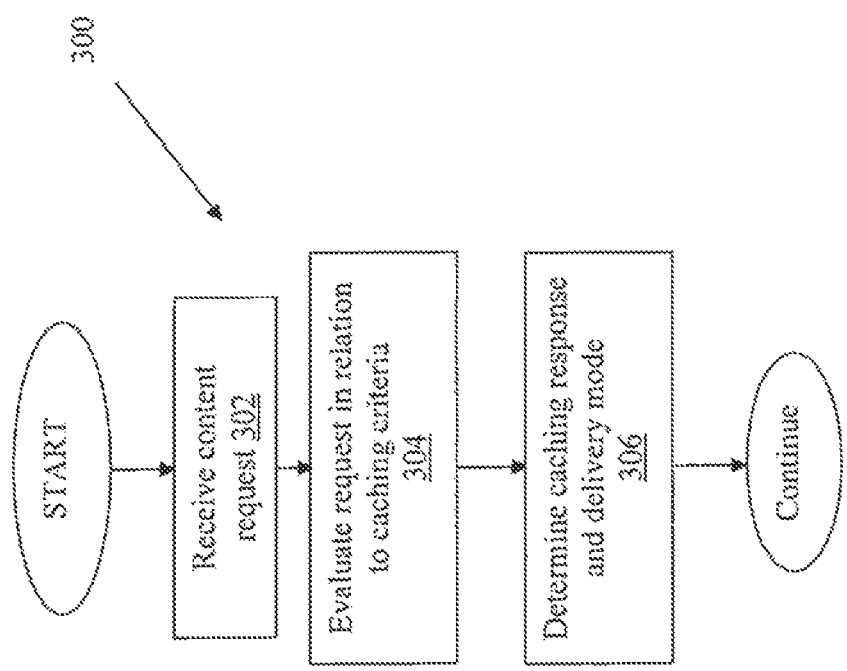

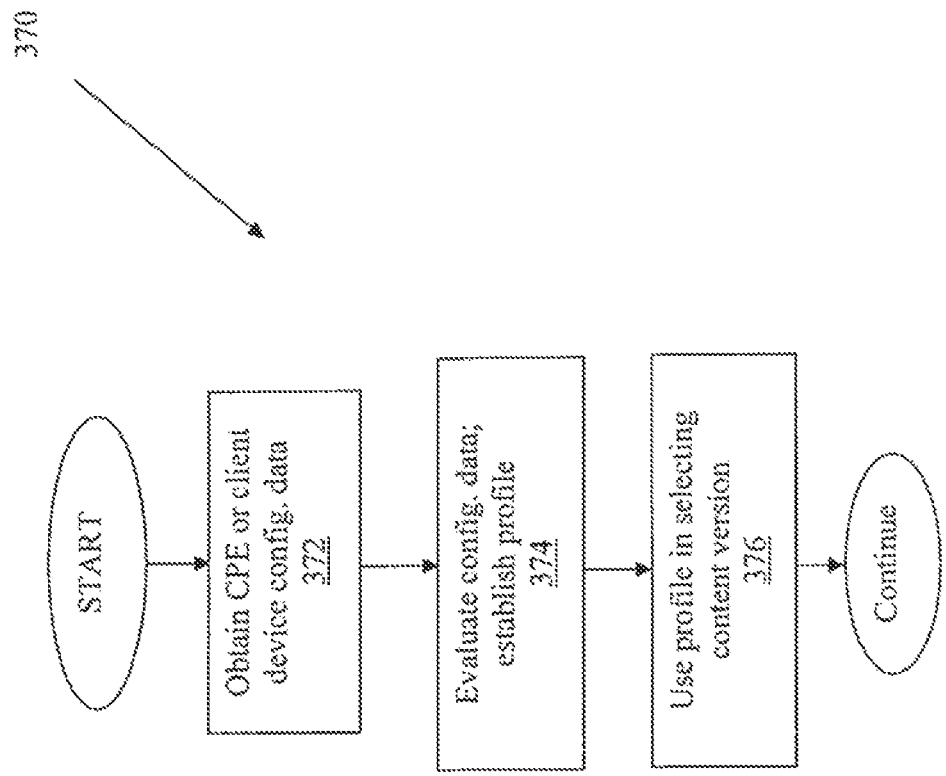

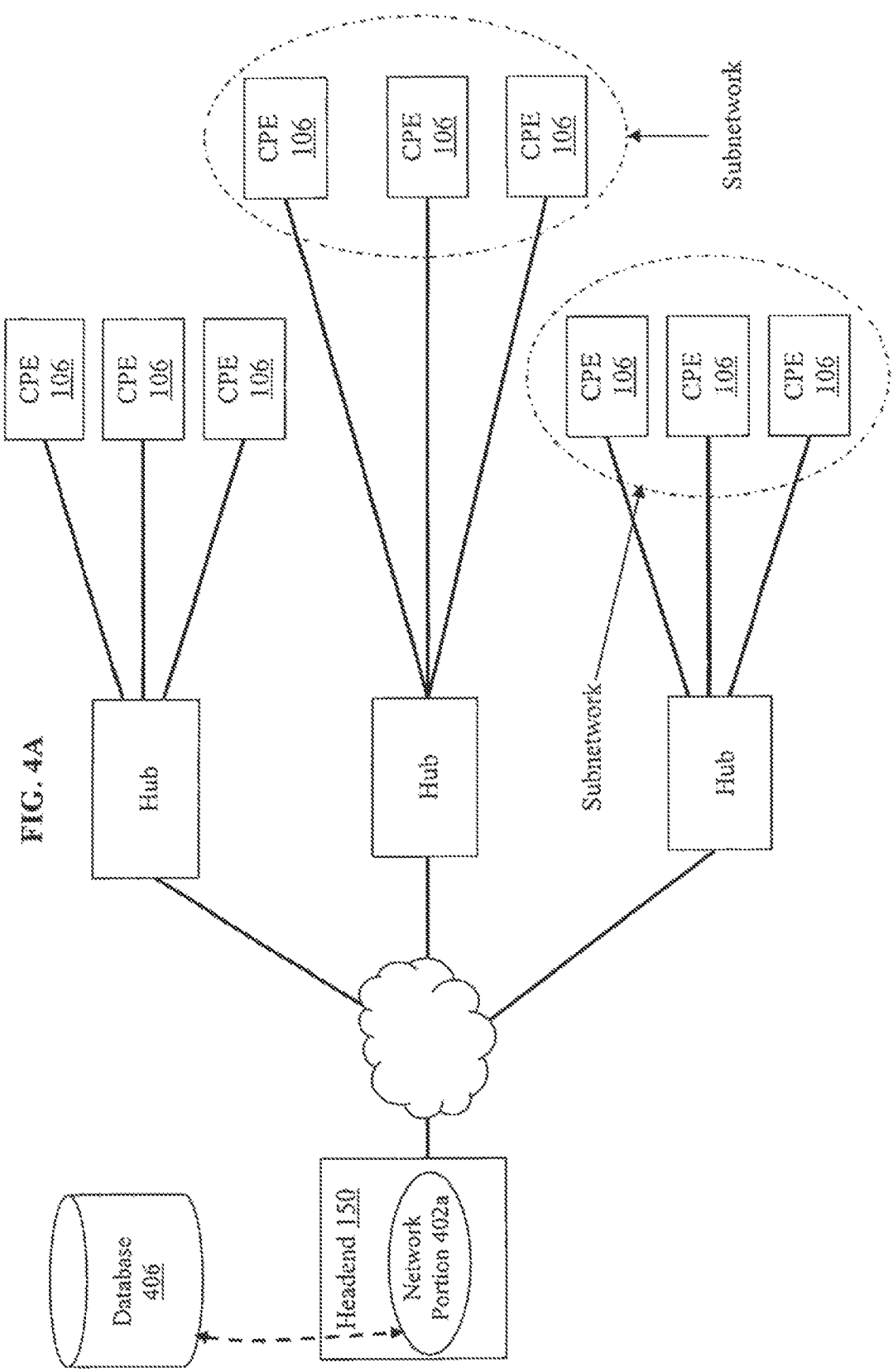

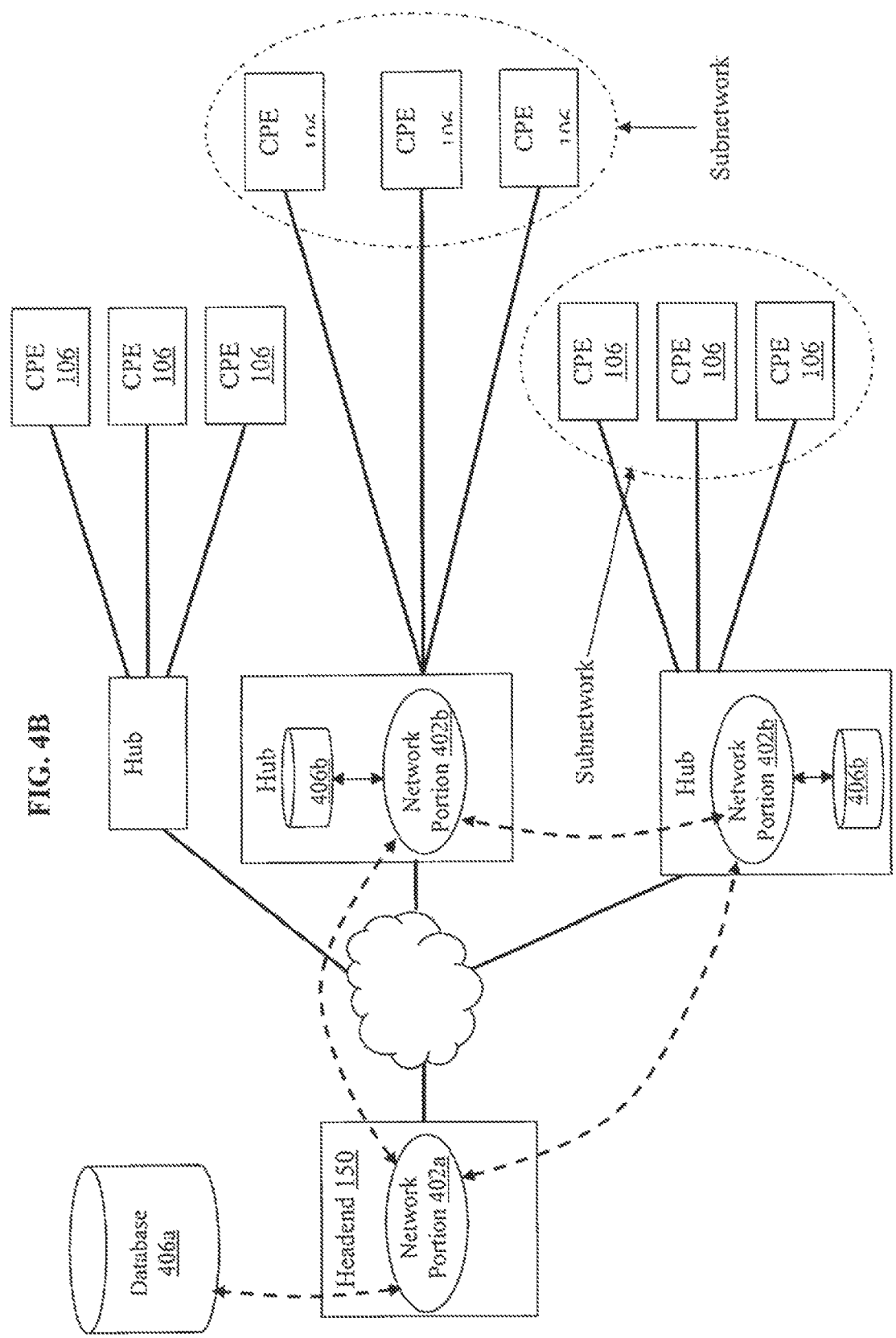

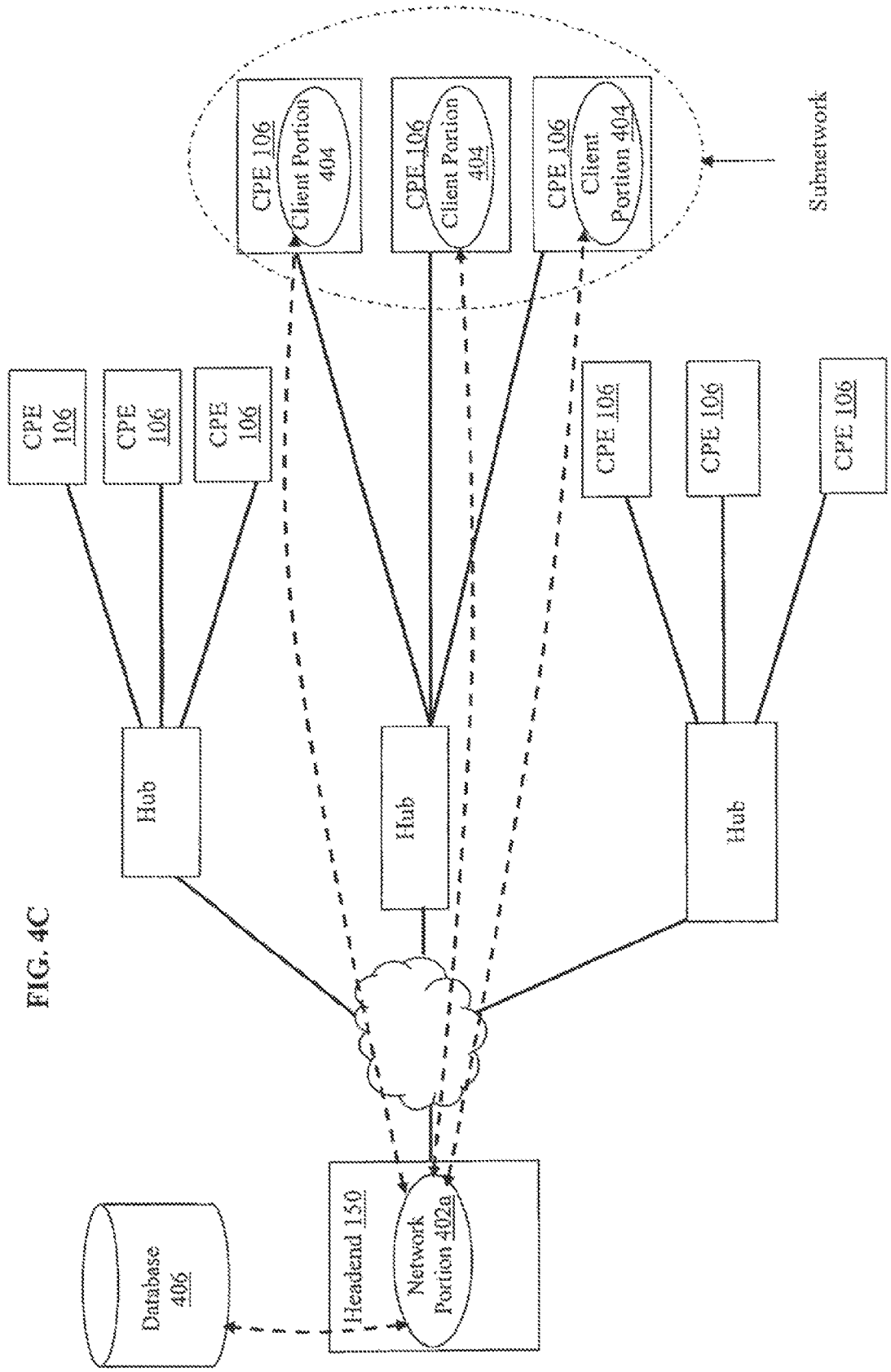

METHODS AND APPARATUS FOR CONTENT CACHING IN A VIDEO NETWORK

PRIORITY AND RELATED APPLICATIONS

This application is a divisional of and claims priority to U.S. patent application Ser. No. 11/904,375 filed Sep. 26, 2007 of the same title, published as U.S. Patent Application Publication No. 2009/0083279, and which will issue as U.S. Pat. No. 8,561,116 on Oct. 15, 2013, and which is incorporated herein by reference in its entirety. This application is related to co-owned U.S. patent application Ser. No. 11/904,408 filed Sep. 26, 2007 and entitled "METHODS AND APPARATUS FOR DEVICE CAPABILITIES DISCOVERY AND UTILIZATION WITHIN A CONTENT-BASED NETWORK", which is now published as U.S. Patent Application Publication No. 2008/0201748, and patented as U.S. Pat. No. 8,458,753 on Jun. 4, 2013, which is a continuation-in-part (CIP) of U.S. patent application Ser. No. 11/363,577 entitled "METHODS AND APPARATUS FOR SELECTING DIGITAL CODING/DECODING TECHNOLOGY FOR PROGRAMMING AND DATA DELIVERY" filed Feb. 27, 2006, which is now published as U.S. Patent Application Publication No. 2007/0204311, and patented as U.S. Pat. No. 7,916,755 on Mar. 29, 2011, which are both incorporated herein by reference in their entirety. This application is also related to U.S. patent application Ser. No. 11/726,095 entitled "METHOD AND APPARATUS FOR CONTENT DELIVERY AND REPLACEMENT IN A NETWORK" filed Mar. 20, 2007, which is now published as U.S. Patent Application Publication No. 2008/0235746, and incorporated by reference herein in its entirety. This application is also related to U.S. patent application Ser. No. 11/363,578 entitled "METHODS AND APPARATUS FOR SELECTING DIGITAL ACCESS TECHNOLOGY FOR PROGRAMMING AND DATA DELIVERY", which is now published as U.S. Patent Application Publication No. 2007/0204314, and patented as U.S. Pat. No. 8,170,065 on May 1, 2012, and U.S. patent application Ser. No. 11/364,147 entitled "METHODS AND APPARATUS FOR SELECTING DIGITAL INTERFACE TECHNOLOGY FOR PROGRAMMING AND DATA DELIVERY", which is now published as U.S. Patent Application Publication No. 2007/0204300, and patented as U.S. Pat. No. 8,718,100 on May 6, 2014, both filed Feb. 27, 2006, and both incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content distribution across a network. More particularly, the present invention is related in one exemplary aspect to the selective caching of video content within a content-based and data network having a set of electronic devices with at least some heterogeneous capabilities so as to inter alia maximize network efficiency.

2. Description of Related Technology

Digital Television

Digital TV (DTV) is a technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including HFC, satellite, wireless, or terrestrial.

DTV broadcasts are generally more efficient and more flexible than analog methods. For example, the bandwidth required to transmit video programming using DTV is less than the bandwidth required using analog methods, assuming similar quality of video (and audio). Thus, more video programming can generally be transmitted with a given bandwidth when DTV methods are employed.

A broad variety of electronic devices have recently been developed to utilize and leverage emerging DTV delivery capabilities. The devices often have very different capabilities, and may include e.g., digital set-top boxes (DSTBs), personal computers (PCs) or laptops, personal digital assistants (PDAs), hand-held computers, "smartphones", personal media devices (PMDs), etc.

These devices can be operatively coupled to, and placed in communication with, other devices (whether of the same or different configuration), or other network entities such as a central information source or server via various channels. The different capabilities of these electronic devices may result from different purposes, designs, different user configuration, being mobile versus fixed in nature, cost/features, etc., and may include differing encryption support capabilities, conditional access profiles, memory and/or processing capability, video or audio codecs, network interfaces, and so forth. Many of these features, including notably the coding/decoding (codec), video resolution, conditional access (CA), and network interface capabilities, are critical to the proper selection, delivery, and playing of content at the end-user device.

The traditional method of digital encoding or compression is the well-known MPEG-2 format. More advanced codecs include H.264 (also known as MPEG-4) and VC-1. H.264 is a high compression digital video codec standard written by the ITU-T Video Coding Experts Group (VCEG) together with the ISO/IEC Moving Picture Experts Group (MPEG) as the product of a collective partnership effort known as the Joint Video Team (JVT). The ITU-T H.264 standard and the ISO/IEC MPEG-4 Part-10 standard (formally, ISO/IEC 14496-10) are highly similar, and the technology is also known as AVC, for Advanced Video Coding. DTV methods of program distribution are also generally more flexible than analog methods. For example, the type of compression may be modified or updated. The compression can be improved when new techniques become available, or they may be customized or optimized for certain applications and attributes such as picture quality, data integrity or transmission delay.

Digital rendering also lends itself to transcoding of content. As used herein, the term "transcoding" refers generally to the process of changing content from one encoding to another. This may be accomplished for example by decoding the encoded content, and then re-encoding this into the target format. Transcoding can also accomplish the encoding of content to a lower bitrate without changing video formats, a process that is known as transrating.

Compression artifacts are typically cumulative: therefore, transcoding between lossy codecs causes a progressive loss of quality with each successive iteration. For this reason, transcoding between lossy codecs is generally discouraged unless unavoidable. It is better to obtain a copy of the content in a lossless format, and then encode directly from the lossless source file to the lossy formats required, thereby causing the minimum degradation.

Transcoding is used in many areas of content adaptation: however, it is commonly employed in the area of mobile phones or devices. In such mobile applications, transcoding is essential due to the diversity of mobile devices. This diversity effectively requires an intermediate state of content adaptation, so as to ensure that the source content will adequately present on the target device (e.g., mobile phone).

On-Demand (OD) Content Distribution

In the recent years, content distribution network operators have started moving away from broadcast distribution model; where users had to choose from programs delivered on the network, to on-demand distribution model; where a program is delivered to a user based on his selection.

A video-on-demand (VOD) system is one example of on-demand content distribution. In a typical video-on-demand system, a user can browse and select from a number of multimedia programs available on a VOD server. When a user selects a program to view, the content is suitably delivered from a VOD server (or multiple VOD servers) to a customer premises equipment (CPE) such as the user's set-top box (STB).

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VOD content consists of movies only, and so forth. Many of these services, although referred to by names different than VOD, still share many of the same basic attributes including storage, network and decoder technologies.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on VOD servers very close to customer premises), as well as various other network architectures there between. Since most cable television networks today consist of optical fiber towards the "core" of the network which are connected to coaxial cable networks towards the "edge". VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

In a typical on-demand distribution network, the attributes of the content thus delivered will depend on several factors such as the available network bandwidth, the user's service tier and the video decoding capability of the user's STB.

Emerging Challenges

Expanded on-demand content storage and delivery is giving rise to a new problem; i.e., deciding whether to cache one or more content versions each with certain unique attributes (such as differing video resolution, bitrate and codec requirements) in order to make multiple versions of content immediately available, or rather to transform the content "on the fly" from a source format into a format suitable for a requesting user's target device. At one end of the spectrum, a great number of different encoding/bitrate/encryption variants of each program could be pre-stored. This approach is however very inefficient from a storage consumption standpoint, although will obviate most if not all transcoding or transrating (thereby providing a cost savings since few transcoders/transraters will be needed), and would conceivably also reduce latency associated with servicing each request. At the other end of the spectrum, one could store only one version of a particular content element, and transrate/transcode for most every instance; this would increase cost and latency, but eliminate storage issues. Regardless of where on that spectrum one operates, however, every single request for content is processed under prior art approaches as if unique or sui generis. Stated differently, failure to detect and utilize duplications of requests for specific content and encoding/bitrate/encryption combinations increases the MSO's burden in servicing so many ostensibly unique requests.

Caching price points depend largely on recording technology such as hard drives (HDDs) and while more storage capacity is being added continually, demands for this storage space are also increasing due to functions such as personal and network DVR (pDVR, nDVR). Also, constraints on network devices such as transcoders and transraters may exist due to, e.g., cost, limitations on rack space, availability of other support equipment, latency, etc.

Moreover, in many instances, the range of decoding, bitrate, and encryption capabilities found within devices used in conjunction with broadband networks is increasing significantly with time. Not every device on the network will be known about ahead of time (including its attributes such as decoding capability, bitrate capability, and DRM), thereby often frustrating attempts at transforming content in advance. Such ad hoc content requests must therefore often be processed (i.e., the content transformed) "on-the-fly" in order to support such a large range of devices and capabilities.

Accordingly, it would be most desirable to implement methods and apparatus that allow the operator of a managed network to perform trade-off between server storage capacity and other network equipment (e.g., transcoding capability).

SUMMARY OF THE INVENTION

The foregoing needs are satisfied by the present invention, which discloses, inter alia, methods and apparatus for managing the caching, transcoding, transrating, and/or transcrypting of content delivered over a network.

In a first aspect of the invention, a method of operating a network having a plurality of client devices associated therewith is disclosed. In one embodiment, the method comprises: receiving a request for a content element rendered in a first format; determining whether the request comprises a first request for the content element rendered in the first format within a period of time; if the determining indicates that the request comprises the first request within the period of time, then transforming a source content element into the content element rendered in the first format; and if the determining indicates that the request is not the first request for the content element rendered in the first format within the period of time, then checking a cache for the content element rendered in the first format.

In one variant, if the content element rendered in the first format is not stored within the cache, the method comprises transforming the source content element into the content element rendered in the first format, and caching the transformed content element.

In another variant, if the content element rendered in the first format is stored within the cache, the method comprises serving the request from the cache.

In yet another variant, the network comprises a cable network, and at least some of the client devices comprise Internet Protocol (IP) enabled devices.

In still a further variant, the network comprises a cable network, and the transforming comprises transforming from a second encoding format to an encoding of the first format.

Alternatively, the transforming comprises transforming from a first bitrate to a second bitrate.

In a second aspect of the invention, network apparatus for use is a cable network is disclosed. In one embodiment, the apparatus comprises: a server adapted to serve at least video content elements; a storage device adapted to store a plurality of video content elements: a transformation entity adapted to transform ones of the video content elements from a first form to a second form; and a controller operatively communicating with server, storage device, and transformation entity. The controller is adapted to evaluate requests for the video content elements to determine whether the ones of the content elements in the second form should be stored in the storage device or not.

In one variant, the transformation entity is adapted to perform at least one of: (i) trancryption; (ii) transcoding; and (iii) transrating.

In another variant, the controller comprises a computer program, and the evaluation of the requests comprises determining whether a requested one of the video content elements has been previously requested at a predetermined frequency or higher.

In a further variant, the evaluation of the requests comprises determining whether a requested one of the video content elements has been previously stored in the storage device in the second form.

In yet another variant, the apparatus further comprises a database adapted to store information relating to attributes of the video content elements stored on the storage device.

In a third aspect of the invention, a method of operating a content-based network is disclosed. In one embodiment, the network has a content storage device and a plurality of client devices associated therewith, and the method comprises: selectively and temporarily storing a plurality of content elements within the storage device; selectively removing ones of the content elements from the storage device when one or more criteria for removal are met, the criteria relating at least in part to requests for the content elements from the plurality of client devices.

In one variant, the one or more criteria comprises the frequency of request for the ones of the content elements falling below a predetermined threshold.

In another variant, the network comprises a cable television network, and the plurality of devices have a plurality of different decoding and bitrate capabilities, the selective storing of the plurality of content elements being based at least in part on plurality of different decoding and bitrate capabilities.

In yet another variant, the selectively removing comprises removing the ones of the content elements according to a priority scheme or hierarchy.

In still a further variant, the selective removal is performed only when storage space restrictions exist which necessitate the removal.

In a fourth aspect of the invention, a method of operating a network having a plurality of substantially heterogeneous client devices associated therewith is disclosed. In one embodiment, the method comprises: making available a plurality of different content elements; receiving a request for one of the content elements in a particular format; evaluating the request to determine whether the request can be serviced by using a cached version of the requested content element rendered in the particular format; and where the request cannot be serviced using a cached version, transforming another version of the requested one of the content element into a version rendered in the particular format, and delivering the transformed version.

In one variant, the network comprises a cable television network, and the particular format comprises a particular video encoding type, and the transforming comprises transcoding.

In another variant, the method further comprises speculatively caching the transformed version based at least in part on a prediction of future demand for the transformed version.

In yet another variant, the method further comprises: receiving a second request for the one of the content elements in the particular format; caching the transformed version based at least in part on the second request.

In another embodiment, the method comprises: making available a plurality of different content elements; receiving a request for one of the content elements in a particular format; evaluating the request to determine whether the request is best serviced by either (i) using a cached version of the requested content element rendered in the particular format, or (ii) transforming another version of the requested content element into the particular format; and based on the evaluating, performing at least one of delivering the cached version of the requested content element in the particular format, or transforming the another version into a version rendered in the particular format and delivering the transformed version.

In a fifth aspect of the invention, network server apparatus for use is a cable network is disclosed. In one embodiment, the server apparatus comprises: a server adapted to receive video content in a first format from a content source, and serve the video content to one or more users of the network; a controller operatively communicating with the server, the controller adapted to evaluate requests for the video content from the users to determine whether to: serve an individual one of the content requests from a storage device associated with server; cause transformation of the content from the first format to a second format to produce transformed content, and serve the one request using the transformed content, and not cache the transformed content; or cause transformation of the content from the first format to a second format to produce transformed content, and serve the one request using the transformed content, and cache the transformed content for use in serving a subsequent request for the video content in the second format.

In one variant, the server comprises a video on demand (VOD) server, the controller comprises a computer program, and the evaluation of the requests comprises determining whether the video content has been previously requested at a predetermined frequency or higher.

In another variant, the evaluation of the requests comprises determining whether the video content has been previously stored in a storage device in the second format.

In a sixth aspect of the invention, a method of operating a network having a plurality of client devices associated therewith is disclosed. In one embodiment, the method comprises: receiving a request for one of a plurality of content elements rendered in a particular format, the content elements being made available for access by the client devices; evaluating the request to determine whether the request can be serviced by using a cached version of the requested content element rendered in the particular format; where the request cannot be serviced using a cached version, further evaluating one of a plurality of transformation options for the requested content element; and selecting one of the transformation options based at least in part on the further evaluating.

In a seventh aspect of the invention, a method of doing business is disclosed. In one embodiment, the method comprises accepting consideration in exchange for adjusting the priority of certain content (e.g., advertisements or promotions) within a content caching architecture. In another embodiment, the method comprises accepting consideration for offering a greater variety of versions of a given content element within the aforementioned caching architecture.

In an eighth aspect of the invention, a computer readable apparatus having a storage medium is disclosed. In one variant, the medium contains a computer program adapted to provide content caching and de-caching controller functions within an MSO network.

In a ninth aspect of the invention, a network system is disclosed. In one embodiment, the network system comprises an HFC cable network having a headend and a plurality of hub sites, and is adapted to deliver IP communications via its transport, such as via a DOCSIS cable modem or in-band QAM. Various types of user devices may be coupled to the system including CPE, PCs, WiFi-enabled devices, IP TV devices, mobile devices, and so forth, and content within the network system is selectively cached and de-cached based on one or more criteria such as frequency of use.

In a tenth aspect of the invention a network server apparatus for use in a content delivery network is disclosed. In one embodiment, the apparatus includes a server configured to (i) receive video content in a first format from a content source, (ii) receive a plurality of requests for individuals of the plurality of content in at least one second format from individual ones of a plurality of users of the network, and (iii) serve the video content in the at least one second format to the individual ones of the plurality of users of the network. The apparatus further includes a controller in operative communication with the server, the controller configured to: (i) receive requests for the video content from the individual ones of the plurality of users, (ii) utilize the received requests to determine a predicted pattern of behavior with respect to the video content rendered in the at least one second format, and (iii) determine time periods based at least in part on the predicted pattern of behavior with respect to the video content, a first one of the time periods including a time within which the video content is cached, and a second one of the time periods including a time within which the video content is not cached, the first and the second ones of the time periods configured not to overlap.

In an eleventh aspect of the invention, a computer readable apparatus including a storage medium is configured to store a plurality of instructions thereon, the plurality of instructions configured to, when executed: (i) receive a plurality of content in a first format from a content source, (ii) receive a plurality of requests for individual ones of the plurality of content in at least one second format from individual ones of a plurality of users, (iii) evaluate the plurality of requests to generate predictions of future demand for the individual ones of the plurality of content in at least one second format, (iv) when a prediction for at least one of the individual ones of the plurality of content reaches a predetermined threshold, cache the at least one of the individual ones of the plurality of content, and (v) provide the at least one of the individual ones of the plurality of content in the at least one second format to the individual ones of the plurality of users.

In a twelfth aspect of the invention, a method of providing cached content in a network is disclosed. In one embodiment, the method includes receiving content in a first format from a content source, receiving requests for the content in at least one second format, evaluating the received requests to generate a prediction of future demand for the content in at least one second format, and when the prediction for the content in at least one second format reaches a predetermined threshold, caching the content in the at least one second format.

In a thirteenth aspect of the invention, an apparatus configured to cache content in a network is disclosed. In one embodiment, the apparatus includes a plurality of instructions which are configured to, when executed, cause the apparatus to receive a plurality of content in a first format from a content source, receive a plurality of requests for individual ones of a plurality of content rendered in at least one second format from individual ones of a plurality of users, utilize the plurality of requests to determine a predicted pattern of behavior with respect to the individual ones of the plurality of content rendered in the at least one second format, and cache at least one of the individual ones of the plurality of content in the at least one second format, based at least in part on the predicted pattern of behavior.

These and other aspects of the invention shall become apparent when considered in light of the disclosure provided herein.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps, and in which:

FIG. 3 is a logical flow diagram illustrating one embodiment of the generalized method of operating a content based network including content caching.

FIG. 3D is a logical flow diagram illustrating one embodiment of the methodology for determining CPE or client device capabilities according to the invention.

FIG. 4A is a block diagram illustrating a first exemplary embodiment of a network software architecture according to the present invention.

FIG. 4B is a block diagram illustrating a second exemplary embodiment of a network software architecture according to the present invention.

FIG. 4C is a block diagram illustrating a third exemplary embodiment of a network software architecture according to the present invention.

DETAILED DESCRIPTION OF THE INVENTION

Figure 1:
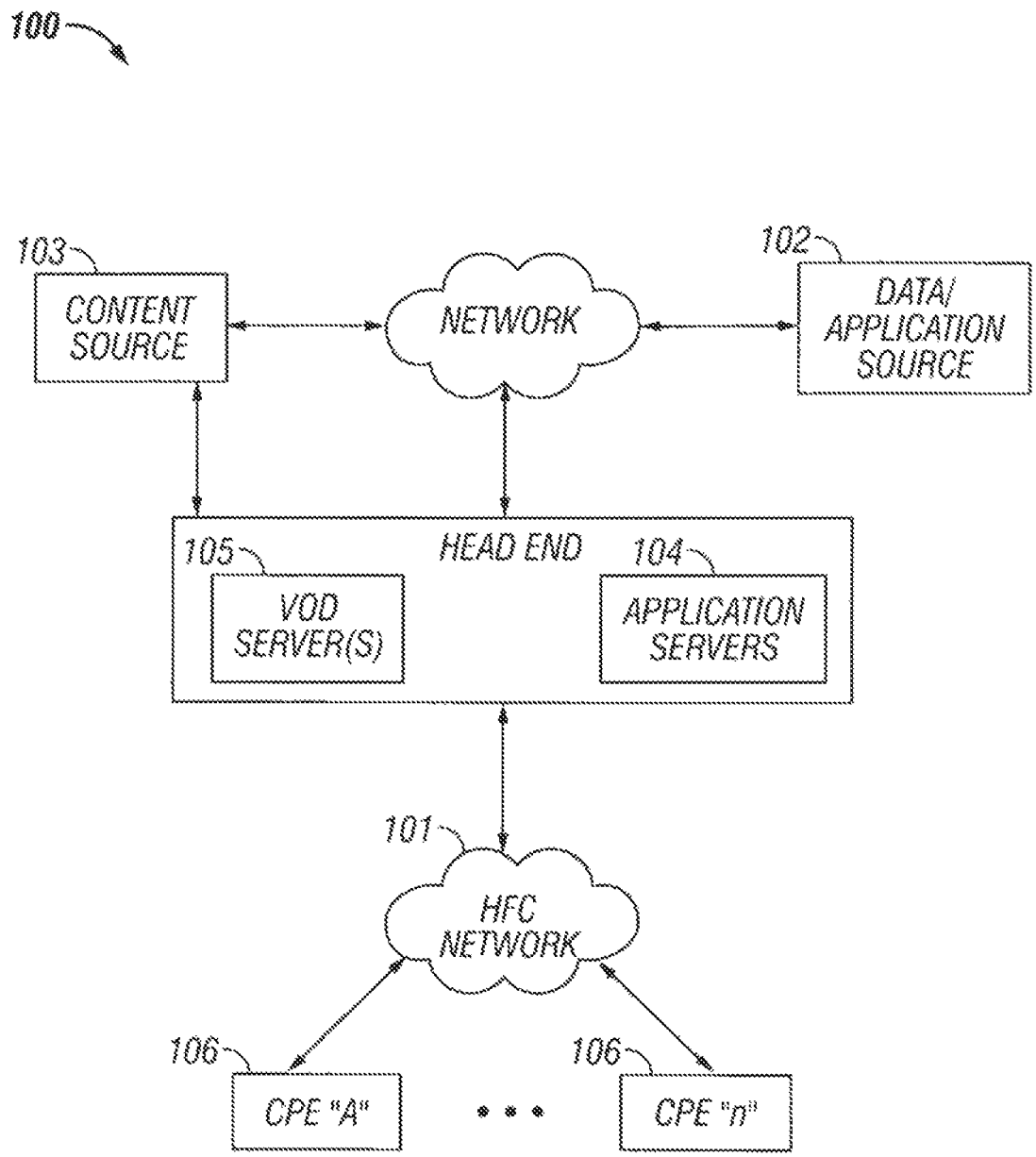
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones such as the Apple iPhone™.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, AVC/H.264, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, MediaCipher, etc.). These can be implemented using, for example, CA-specific hardware/software elements embedded in the device, the so-called "CableCARD™" plug-in security module access technology, a downloadable CA system (DCAS), or otherwise.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively.

Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROMiFlash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise, treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity, such as a GUI.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, 4G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for the "intelligent" caching and de-caching of content within a content-based network using on-demand or other user-specified delivery. The present invention finds significant utility with respect to, inter alia, Video-over-IP, IPTV, Video to Mobile devices, and other similar applications within a content-based system such as a cable television or satellite network.

Specifically, the present invention addresses the previously described issues relating to the trade-off between content storage space and transcoding/transrating/transcrypting efficiencies within the system that occur as a result of trying to support a broad range of end-user device profiles and capabilities. By evaluating the demand for certain content elements and formats within the network, and identifying "duplications" of requests (or alternatively, the "proximity" of one request to another in content/encoding/bitrate/encryption space), the caching controller of the present invention is able to dynamically balance caching of multiple versions of a content element (e.g., movie) and the need for "on the fly" transcoding/trasrating/transcryption and associated assets. In this fashion, greater efficiencies and economies of scale in operating the network can be realized while simultaneously supporting a wide range of devices.

In one exemplary embodiment, the aforementioned caching controller algorithms are completely passive; i.e., they operate without any a priori knowledge of the requesting device or their capabilities.

In another embodiment, such knowledge of the capabilities of client devices within the network is used to inter alia provide a speculative or predictive caching capability.

A content caching architecture is disclosed comprising the aforementioned caching controller (e.g., a software process running on a VoD server or Session Resource Manager (SRM)), a cache or storage area, and a cached content database which allows for rapid searching and determination of pertinent information for the caching controller (e.g., content title, encoding format, bitrate and/or encryption support, as well as the history of requests and optionally deliveries for that content version).

Methods of doing business, and an operational/business "rules engine" are also described.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth conservation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Bearer Network Architecture—

FIG. 1 illustrates a typical content-based network configuration with which the content caching apparatus and methods of the present invention may be used. The various components of the network 100 include (i) one or more data and application origination points 102: (ii) one or more content sources 103, (iii) one or more application distribution servers 104: (iv) one or more VOD servers 105, and (v) customer premises equipment (CPE) 106. The distribution server(s) 104, VOD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VOD servers, and/or CPE devices (as well as different network topologies) may be utilized consistent with the invention. For example, the headend architecture of FIG. 1A (described in greater detail below) may be used.

The data/application origination point 102 comprises any medium that allows data and/or applications (such as a VOD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VOD server 105 comprises a computer system where on-demand (OD) content can be received from one or more of the aforementioned data sources 102 and enter the network system. These servers may generate the content locally, or alternatively act as a gateway or intermediary from a distant source. The VOD server 105 includes the Session Resource Manager (SRM) functionality, and contacts the Digital Network Control System (DNCS) for resources. The DNCS responds with negative or positive response to the request, and the VOD server implements the appropriate resource allocation logic, such as for example that described in co-owned U.S. patent application Ser. No. 10/881,979 filed Jun. 29, 2004 and entitled "METHOD AND APPARATUS FOR NETWORK BANDWIDTH ALLOCATION", which is now published as U.S. Patent Application Publication No. 2005/0289618, is incorporated herein by reference in its entirety, although other approaches and configurations may be used with equal success.

The CPE 106 includes any equipment in the "customers' premises" (or other locations, whether local or remote to the application distribution server 104) that can be accessed by a distribution server 104.

Figure 1A:
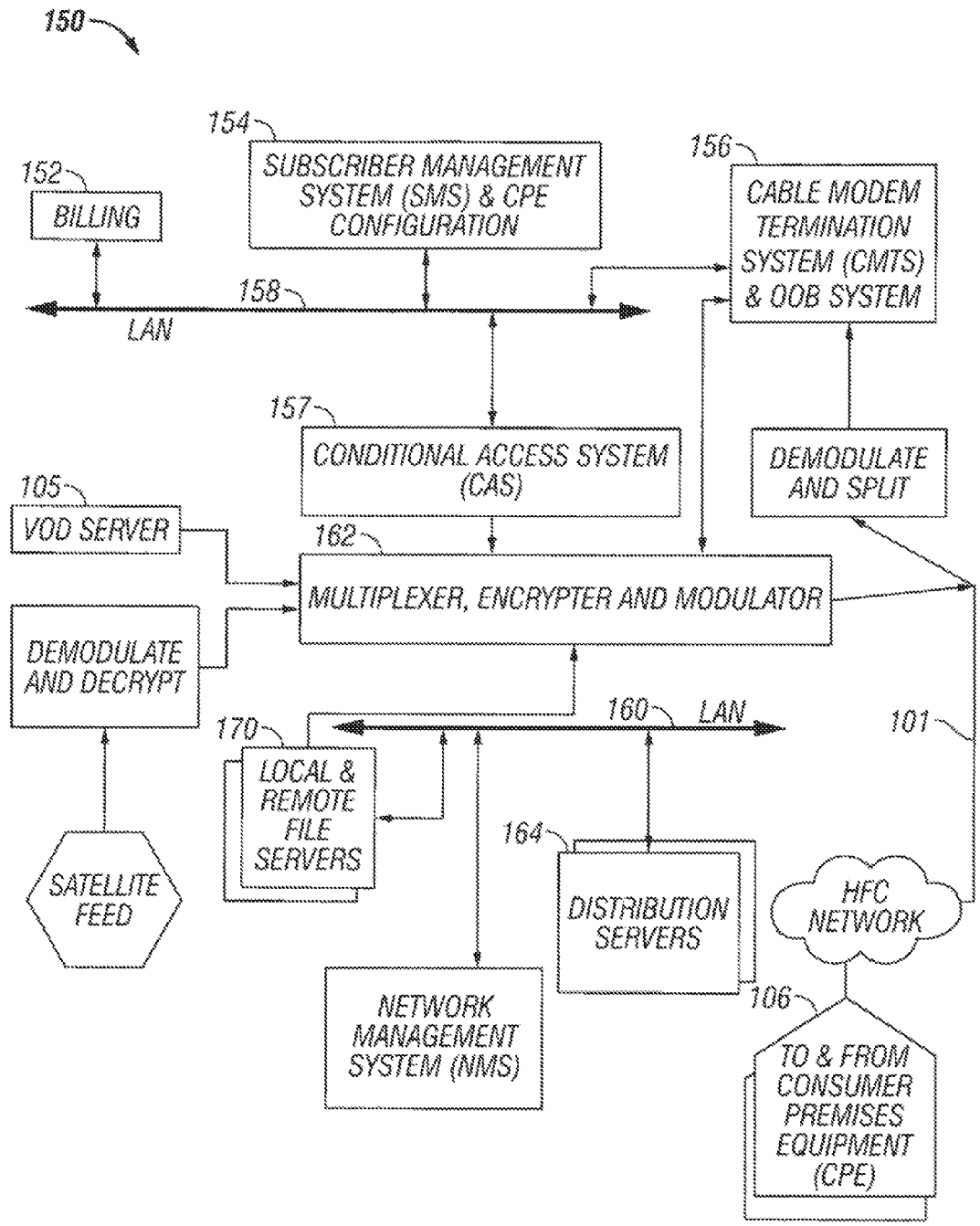
FIG. 1A is a functional block diagram illustrating one exemplary HFC cable network headend configuration useful with the present invention.
Figure 1B:
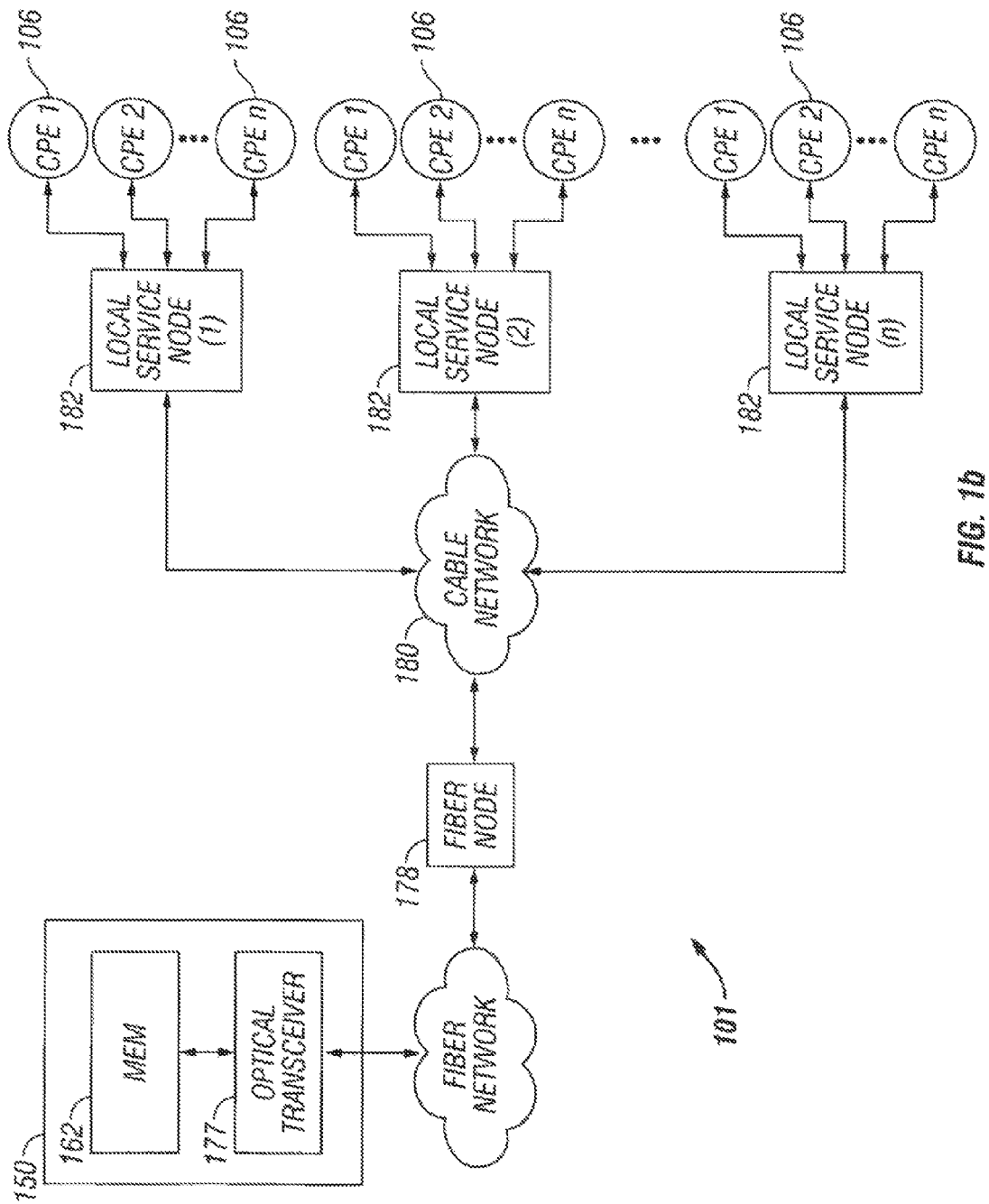
FIG. 1B is a functional block diagram illustrating one exemplary local service node configuration useful with the present invention.

Referring now to FIG. 1A, one exemplary embodiment of a headend architecture useful with the present invention is described. As shown in FIG. 1A, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1A is high-level, conceptual architecture and that each MSO may have multiple headends deployed using custom architectures.

The exemplary architecture 150 of FIG. 1A further includes a multiplexer/encrypter/modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs via a variety of interposed network components.

Figure 1C:
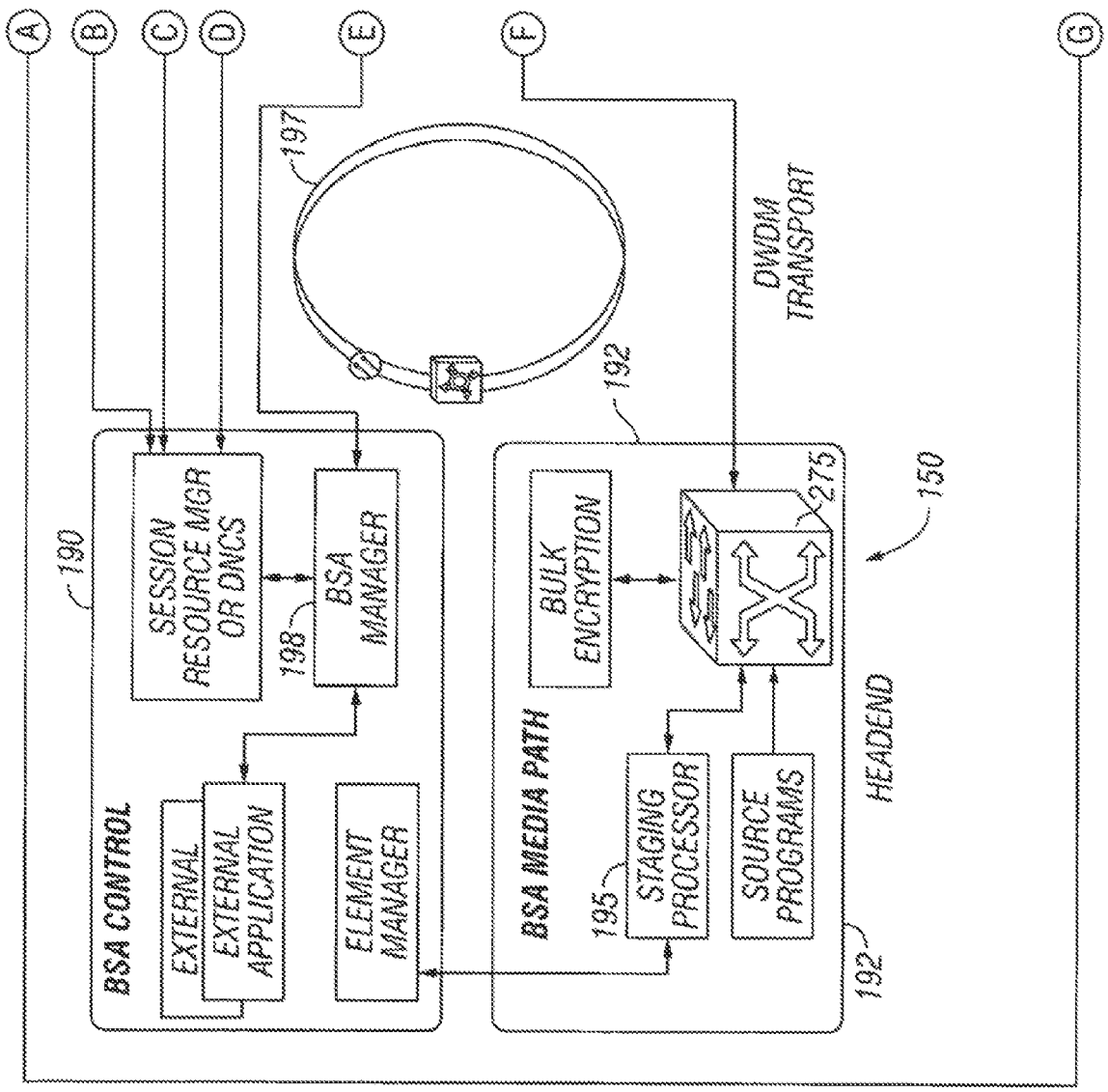
FIG. 1C is a functional block diagram illustrating one exemplary broadcast switched architecture (BSA) network useful with the present invention.
Figure 1C:
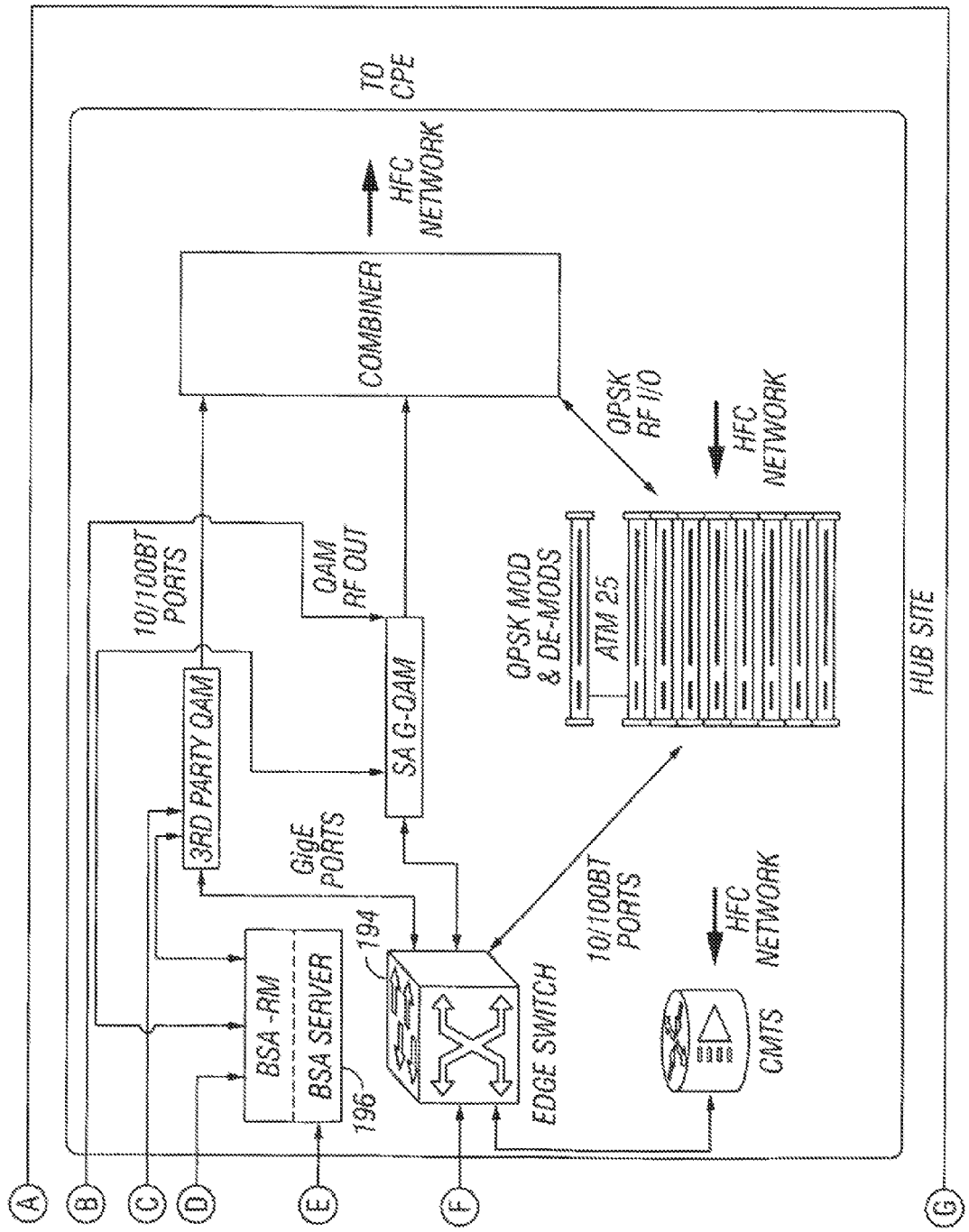

It will also be recognized, however, that the multiplexing operation(s) need not necessarily occur at the head-end 150 (e.g., in the aforementioned MEM 162). For example, in one variant, at least a portion of the multiplexing is conducted at a BSA switching node or hub (see discussion of FIG. 1C provided subsequently herein). As yet another alternative, a multi-location or multi-stage approach can be used, such as that described in U.S. patent application Ser. No. 11/048,334, filed Feb. 1, 2005 and entitled "APPARATUS AND METHODS FOR MULTI-STAGE MULTIPLEXING IN A NETWORK", which is now published as U.S. Patent Application Publication No. 2006/0171423, and patented as U.S. Pat. No. 7,602,820 on Oct. 13, 2009, is incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (content or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-owned U.S. patent application Ser. No. 09/876,677 filed Jun. 7, 2001 and entitled "HYBRID CENTRAL/DISTRIBUTED VOD SYSTEM WITH TIERED CONTENT STRUCTURE", which is now published as U.S. Patent Application Publication No. 2002/005961, and patented as U.S. Pat. No. 7,690,020 on Oct. 30, 2010, is incorporated herein by reference in its entirety.

Many other permutations of the foregoing system components and communication methods may also be used consistent with the present invention, as will be recognized by those of ordinary skill in the field.

"Switched" Networks

FIG. 1C illustrates an exemplary "switched" network architecture also useful with the content caching features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1C shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", which is now published as U.S. Patent Application Publication No. 2003/005621, and patented as U.S. Pat. No. 8,713,623 on Apr. 29, 2014, is incorporated herein by reference in its entirety, describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VOD) systems, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bitrates can be treated as in more conventional systems.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

The edge switch 194 (generally located in the distribution hub as shown in FIG. 1C) is flooded with all available programs. This improves transport efficiency, because a simple unidirectional "drop and continue" protocol is performed at each hub location on a given optical transport ring 197. The concept of flooding also simplifies the transport network in that no control system is needed: rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

In addition to "broadcast" content (e.g., video programming), the systems of FIGS. 1A and 1C also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1C, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Exemplary Caching Architecture—

Figure 2:
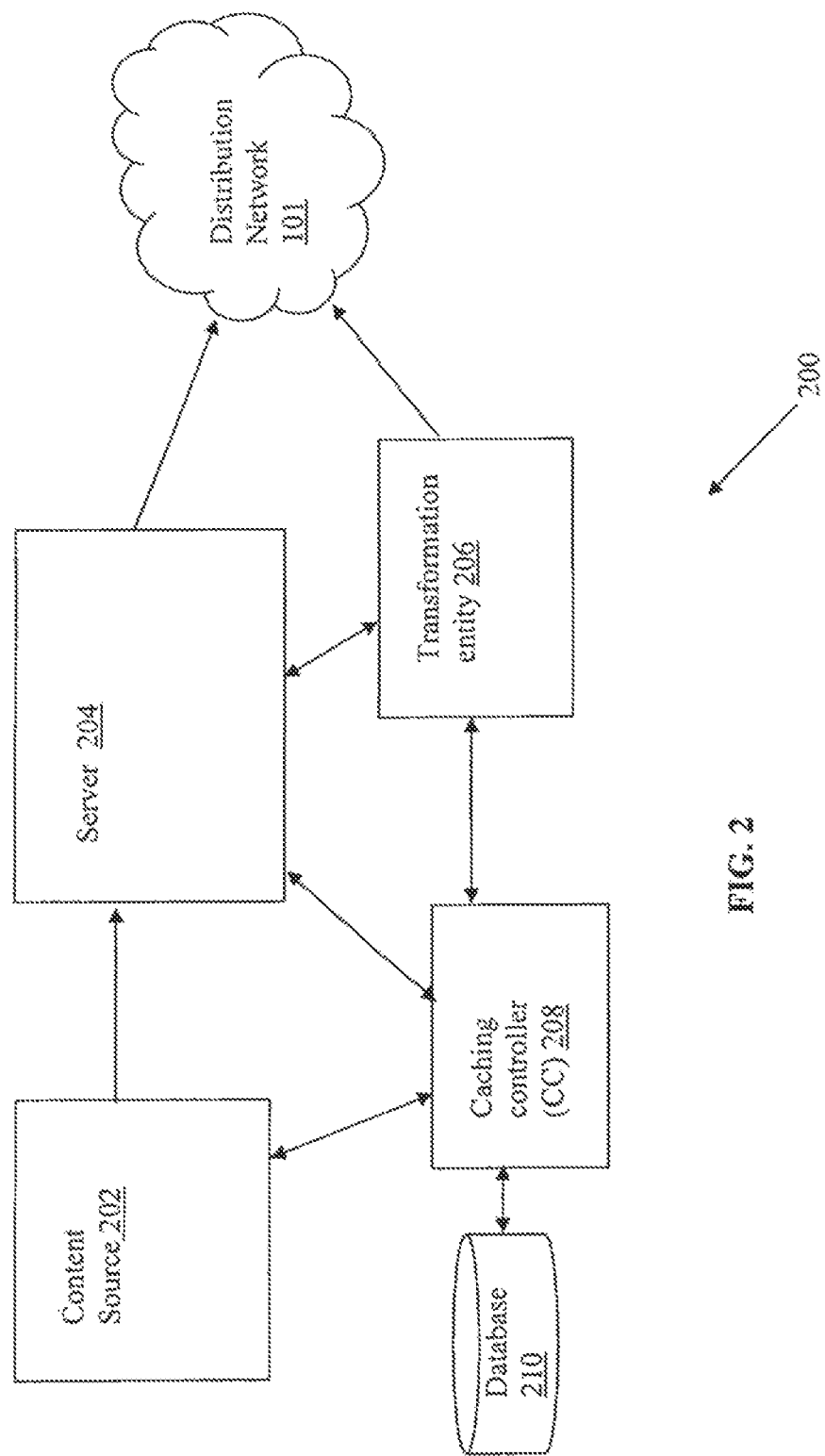
FIG. 2 is a functional block diagram illustrating a generalized content caching architecture according to one embodiment of the present invention.
Figure 2A:
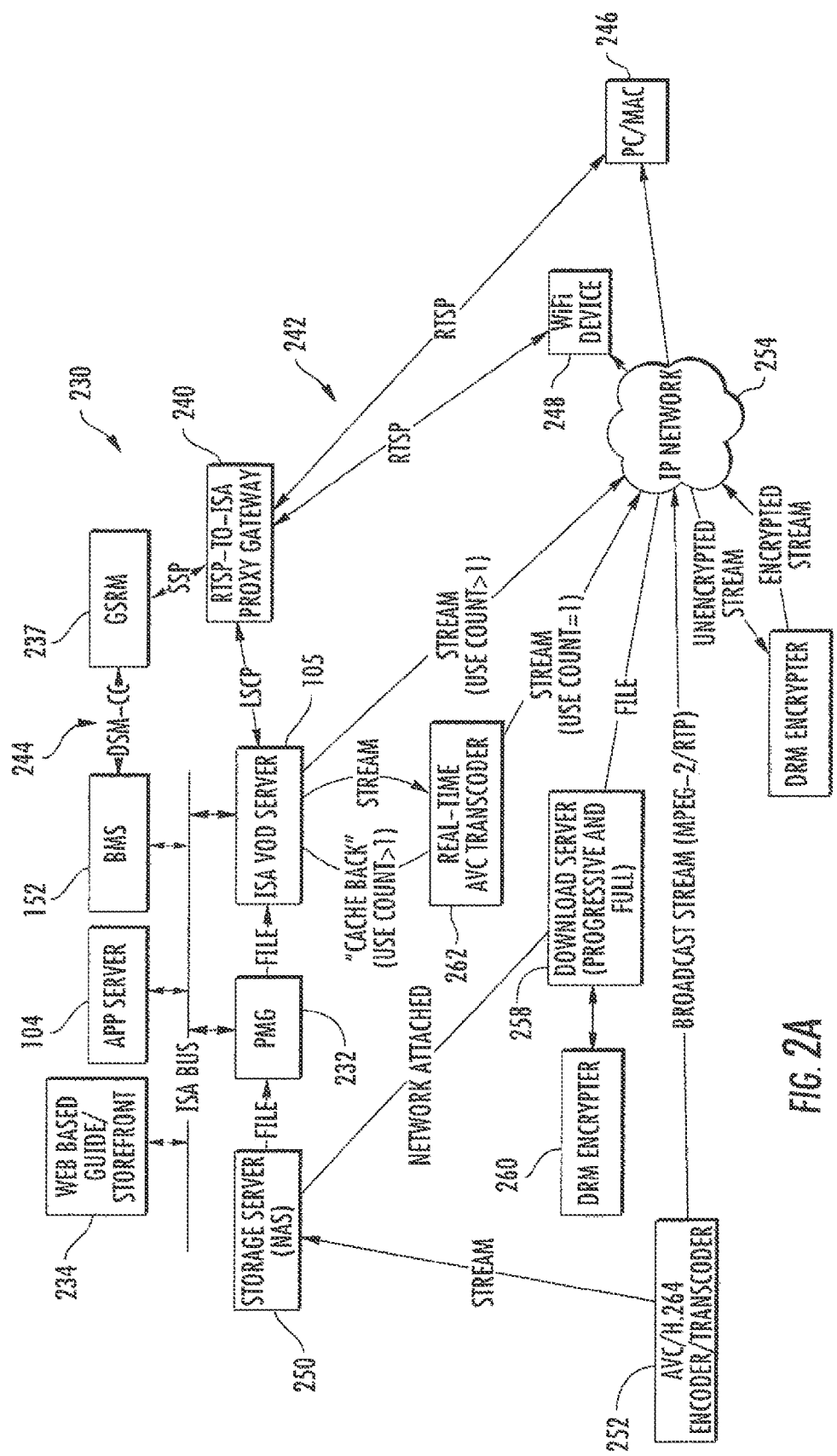
FIG. 2A is a functional block diagram illustrating one exemplary implementation of the generalized architecture of FIG. 2.

Referring now to FIGS. 2-2a, exemplary embodiments of the content caching architecture according to the present invention are described. It will be appreciated that while the following embodiments are described in the context of an on-demand (e.g., VoD) delivery paradigm, the invention is in no way so limited. For example, the apparatus and methods of the invention may be applied to e.g., pay-per-view (PPV) models, delivery of broadcast streams that include inserted content that is pre-stored (e.g., advertisements or promotions), and so forth.

FIG. 2 illustrates one exemplary embodiment of the generalized content caching architecture according to the present invention, in the context of a cable television network. As shown in FIG. 2, the architecture 200 generally comprises a content source 202, content server 204, transformation entity (e.g., transcoder, transrater, transcrypter) 206, and a caching controller 208. The content source 202 provides content encoded or formatted according to a first scheme or specification, and the transformation entity 206 selectively transforms that content from the first scheme to the second scheme as described subsequently herein. This transformation may occur after the content is "served" by the content server 204 as illustrated, during the serving process (e.g., on the fly), or alternatively before the content is served. Under any approach, different schemes for delivery of the transformed content may be employed; e.g., such as where the content is pre-transformed and stored, or alternatively where the content is transformed in a "just in time" fashion for streaming over the network. Various other approaches will be recognized by those of ordinary skill in the art.

In one embodiment, the server 204 also comprises the cache or storage space used to store content, although a separate or stand-alone cache may also be used, as well as any number of other approaches.

The controller 208 is used to determine and/or apply caching policies for the content provided by the source/server, as described in greater detail subsequently herein. For example, in one embodiment, the caching policy comprises determining whether a predetermined or variable threshold for the number of requests for a particular content element (e.g., movie) in a particular format or encoding (e.g., MPEG-4) has been exceeded, and if so caching that content within a storage location (e.g., the server 204) so as to obviate transformation.

As indicated above, the transformation entity 206 may comprise any number of different configurations and functions. In one variant, the transformation entity 206 comprises a transcoder adapted to transcode video and/or audio content from one encoding domain to another. For example, one exemplary process comprises transcoding an MPEG-2 encoded video file to an AVC/H.264 format. This might be useful for example in a case where the delivery channel to the target device (e.g., a laptop, handheld, etc.) is bandwidth constrained, since the H.264 encoding will typically require a lower bitrate for the same content. Similarly, if the target device has only an H.264 codec, the content must be transcoded (or alternatively transcoded on the target platform itself). Any multitude of reasons may exist for transcoding content before delivery.

It will also be recognized that transcoding process may be lossy or non-lossy in nature. For example, in one variant of the invention, a first codec (e.g., algorithm) is used to decode data or files encoded in a first format (F1), and recode the decoded data in a second format (F2). If the first encoding process was lossy, some of the quality of the original data (i.e., before encoding with F1) will be lost in the decoding process, thereby producing decoded or intermediate data that has less quality or coherence to the original data. When a second lossy process is used to encode the decoded data (F2), further losses are sustained, since inter alia the target platform (e.g., CPE or mobile device in the subscriber premises network) will need to decode the F2 encoded format. Hence, multiple decodings and encodings using lossy codecs will rapidly reduce quality in an irreversible manner.

Accordingly, in one embodiment of the invention, the controller 208 is configured to track the number of encodings/decodings experienced by a particular content element (such as via metadata that is updated upon each encoding/decoding) and prohibit further encoding/decoding in the case a prescribed limit is reached. For example, an ingested MPEG-2 encoded content element may be transcoded to AVC/H.264, and then cached for later use. If the transcoded AVC/H.264 element is then used as the basis for a second transcoding to another format (e.g., RealVideo 10), an undesirable level of degradation may result. Hence, the cache controller 208 may be programmed to preclude drawing source content elements from a cache store for example. Myriad approaches to ensuring a limited number of transcodings (or reduction of quality) will be recognized by those of ordinary skill given the present disclosure. These may include for example estimations or actual measurements or calculations of quality degradation, In a "hybrid" implementation, one of the codecs (F1 or F2) may be lossy and the other non-lossy. This approach has less loss of quality than the lossy/lossy approach previously described. Hence, one variant of the invention uses distribution of the original content from the source in a format that is non-lossy, which can then be decoded without loss, and re-encoded in a lossy (or another non-lossy) format. This has the advantage of providing a higher level of quality in the transcoded (and subsequently decoded) data, yet may have the drawback of generally requiring transcoding in most or all cases where such non-lossy formats may not be widely useful within the bearer network.

In a fully loss-less approach, both the F1 and F2 codecs are loss-less, and hence little if any degradation will occur even after multiple transcodings (assuming all codecs in the process are loss-less).

The transformation entity 206 may also transrate the content (optionally independent of whether or not transcoding is performed, or alternatively as part of the transcoding function) in order to adjust the bitrate. Transrating may include for example changing or altering content from one bitrate, GOP (group of pictures) size, resolution, etc. to a different bitrate, GOP size, resolution, etc. (e.g. 3.75 Mbps to 2.00 Mbps). Such transrating may be useful under number of different circumstances. For example, during statistical multiplexing or re-multiplexing operations, transrating may be used to prevent the total aggregated bandwidth from exceeding a prescribed level (e.g. channel capacity). Transrating can also be used for example in the headend 150 to intentionally reduce the bitrate of a transport stream (or certain programs therein) without having to decode and re-encode the content. This may be the case for example where one or more VBR programs exhibit very high bitrate variation from the source. Transrating may also be used to adapt a higher bitrate stream for delivery over a limited bandwidth communication channel, or for target devices that can only handle a lower bitrate (or conversely that cannot make use of the higher bitrate due to display resolution, codec, or other limitations.

A common approach for bit-rate reduction (in the compressed domain) is requantization; e.g., increasing the quantization step-size of the Discrete Cosine Transform (DCT) coefficients in each video block. Open-loop or closed-loop solutions may be used, as may so-called "simple" requantization techniques, which apply the standard complexity model and rate control of TM5 (MPEG-2 Test Model 5) to set a new quantization step-size for each macro-block (MB). As another option, Lagrangian optimization may be used for finding the optimal quantization step for each MB to meet a desired bit-rate with a minimum of distortion. A transrated bit stream provides generally produces a higher peak-signal-to-noise-ratio (PSNR) than a decoder-encoder approach (i.e., re-encoding of the decoded video to the reduced bit-rate).

In terms of GOP size, Intra (I)-frames and Instantaneous Decoder Refresh (IDR) frames serve as the reference for all frames in a GOP. Similarly, P- and B-frames can be referenced by other frames. As is well known, many video technologies transmit a differential frame that is used to indicate a difference between a prior video frame and the current frame in order to minimize a size of frames transmitted at a given frame rate. The differential frame includes only the coded video information that is not identical to the previous frame. A so-called "key" frame is transmitted; the key frame includes coded video information having no correlation with the previous/next video frames. This key frame may be transmitted at different times; e.g., periodically, or at a time when the video image undergoes a significant change. I-frames (H.263 or Moving Picture Experts Group (MPEG)-4), and an IDR-frames (MPEG-4 part-10/H.264) are used to perform key frame functions.

In addition to the coded video data included in the key frame, information necessary for decoding (such as image size and a basic quantization value of the video image) can be included in the key frame. For example, such information includes Video Object Layer (VOL) for MPEG-4 part-2, and Sequence Parameter Set (SPS) and Picture Parameter Set (PPS) for MPEG-4 part-10/H.264. A key frame may be identified as such using the header of the coded video information without fully decoding the encoded data.

Accordingly, in another variant of the invention, parameters related to GOP size or referencing may be varied by the transformation entity 206 so as to achieve desired goals or functionality. For instance, the GOP size can be varied based on QoS or loss data; e.g., a channel prone to packet loss may function better or with less perceptible visual quality degradation if the GOP size is reduced (i.e., the effect of losing one or more I/IDR frames is less). Similarly, the scheme, frequency or rate of transmission of key frames may be altered, as may I-frame or IDR-frame spacing. Various other adjustments or modifications that can be performed by the transformation entity 206 will also be appreciated by those of ordinary skill.

Alternatively (or additionally), the transformation entity 206 may provide transcryption functionality; e.g., translation between one encryption domain to another. For example, transcryption may be used to move between encryption formats used by different content protection or conditional access (CA) systems (e.g., from an MSO's indigenous DRM scheme to another scheme such as Windows Media DRM ("WMDRM") or Digital Transmission Content Protection ("DTCP") on a subscriber PC), or provide a transitory encryption for the digital content while it is being transferred between different systems and/or components. In this fashion, content or other data within the cable security or CA environment can "jump the fence" to DRM or other security environments that may be more widely deployed on IP-based devices for example. This is particularly useful for the IP-based delivery targets such as those described with respect to FIG. 2A herein.

The apparatus of FIG. 2 may also comprise a database 210 useful for inter alia storing and accessing content versions and associated data (e.g., tuples, discussed subsequently herein, or other data structures). In one embodiment, the database comprises a relational or SQL database of the type well known in the data processing arts. A relational database comprises a collection of "relations" (frequently called tables). A relation is generally defined as a set of tuples that each have the same attributes. This may be represented by a table comprising data organized in rows and columns. In a relational database, all of the data stored in a column is typically in the same domain (i.e. data type). The tuples should not have any ordering (i.e., no order to the tuples, and the tuples should not impose any order of the attributes). Yet other approaches for structuring the cached content database may be used consistent with present invention, the foregoing relational database being merely illustrative.

FIG. 2A illustrates one exemplary implementation of the generalized architecture of FIG. 2. Specifically, as shown in FIG. 2A, the architecture 230 comprises a bus (e.g., industry standard or ISA) coupling a plurality of elements including an application server 104, billing management system (BMS) or module 152, VoD server 105, media gateway (MG) 232, and web-based guide and "store front" 234 (e.g., user interface). The BMS is in communication with the global session resource manager (GSRM) 237 via a digital storage media command and control (DSM-CC) protocol of the type well known in the cable television arts. The GSRM is responsible for, inter alia, session establishment and resource management.

Appendix I hereto provides the details of one exemplary implementation of the protocol used by the GSRM (global session resource manager) 237 in communicating with the transformation entity 206 (e.g., transcoder/transrater/transcryptor) as part of creating and managing sessions in accordance with one embodiment of the invention.

The VoD server 105 communicates with a proxy gateway 240 using for example the lightweight stream control protocol (LSCP) or other such protocol. The proxy gateway 240 acts as an interface between the real time streaming protocol (RTSP) domain 242 and the ISA domain 244 as shown in FIG. 2A. The VoD server 105 and other ISA-domain entities therefore use the gateway to communicate with downstream entities such as DSTBs or CPE 106, PCs 246, WiFi-enabled devices 248, and other user or client devices via the RTSP protocol.

The GSRM 237 of FIG. 2A communicates with the CPE 106, PC 246, WiFi devices, etc. via the proxy gateway 240 using inter alia the Session Setup Protocol (SSP). Appendix II hereto provides an exemplary (extended) implementation of the SSP. The exemplary extended SSP of Appendix II includes provisions for providing CPE 106 profile and configuration data as part of the session request protocol. Sample encodings for CPE or other capabilities are also provided.

The media gateway 232 receives media content from a storage server 250, which in turn receives media content from e.g., an encoder/transcoder/transrater 252, such as for example an AVC/H264 device as shown. The encoder/transcoder/transrater also generates a media stream for delivery over a packet protocol (e.g., MPEG-2 over RTP) for delivery over an IP or similar network 254, as shown in FIG. 2A. A digital rights management (DRM) encryption unit 256 is also coupled to the IP network 254 so as to selectively encrypt content for delivery to the subscriber premises or other location(s). A separate pathway between the storage server 250 and the IP network 254 is also optionally provided via an interposed download server 258 (and optional associated DRM encryptor 260).

The media delivered by the MG 232 to the VoD server 105 is selectively delivered downstream to the PC 246, WiFi device 248, etc. in the illustrated embodiment via the IP network 254. Depending on whether transcoding/transrating is required, the content is transcoded/transrated via a transcoder/transrater 262 as shown. In the exemplary logic, a "stream counter" or similar mechanism is used in one embodiment to effect the server caching functions previously described; e.g., caching transcoded or transrated content when the use count exceeds a prescribed threshold (such as 1 one use as indicated on FIG. 2A), or meets one or more other criteria. Accordingly, the delivery to the IP network 254 in the latter case is direct as shown; i.e., the transcoder/transrater 262 is bypassed since the cached and transcoded/transrated content is immediately available.

It will be appreciated that while the exemplary configuration of FIG. 2A shows an IP-based delivery paradigm, the present invention may be used with equal success over other delivery paradigms and transports. For example, in-band downstream delivery of content from the VoD server over the HFC network 101 may be used.

Transmissions of requested content can also be multicast or broadcast over the IP network if desired. This may be desirable where multiple requesting CPE have issued simultaneously (or at least in some fairly close temporal relationship) requests for similar content elements, or where the managerial process (e.g., caching controller 208 or GSRM 237) recognizes that several similar or identical requests are queued or pending servicing.

Exemplary Methods—

Referring now to FIGS. 3-3d, exemplary embodiments of the methods according to the present invention are described.

FIG. 3 illustrates one embodiment of a generalized methodology of operating a content based network (e.g., cable or satellite network) according to the invention. As shown in FIG. 3, the method 300 comprises first receiving a request for content delivery from a user (e.g., via their CPE 106 or other device such as a PC, laptop or handheld computer) per step 302. The request may be routed for example to the GSRM 237 associated with the VoD server 105, as in a VoD session request, which then routes the request (or information relating thereto, such as via an inter-process message) to the caching controller (CC) 208.

Next, per step 304, the request is evaluated in terms of its relationship to one or more caching criteria. For example, the caching controller 208 might determine whether the request is a first request for this content in the required format within a prescribed period of time, number of total requests, etc., or whether other such requests been recently received. Myriad other evaluation schemes may be employed as described subsequently herein with respect to FIGS. 3A-3c.

Per step 306, the results of the evaluation are used to determine the caching response and delivery mode of the requested content.

Figure 3A:
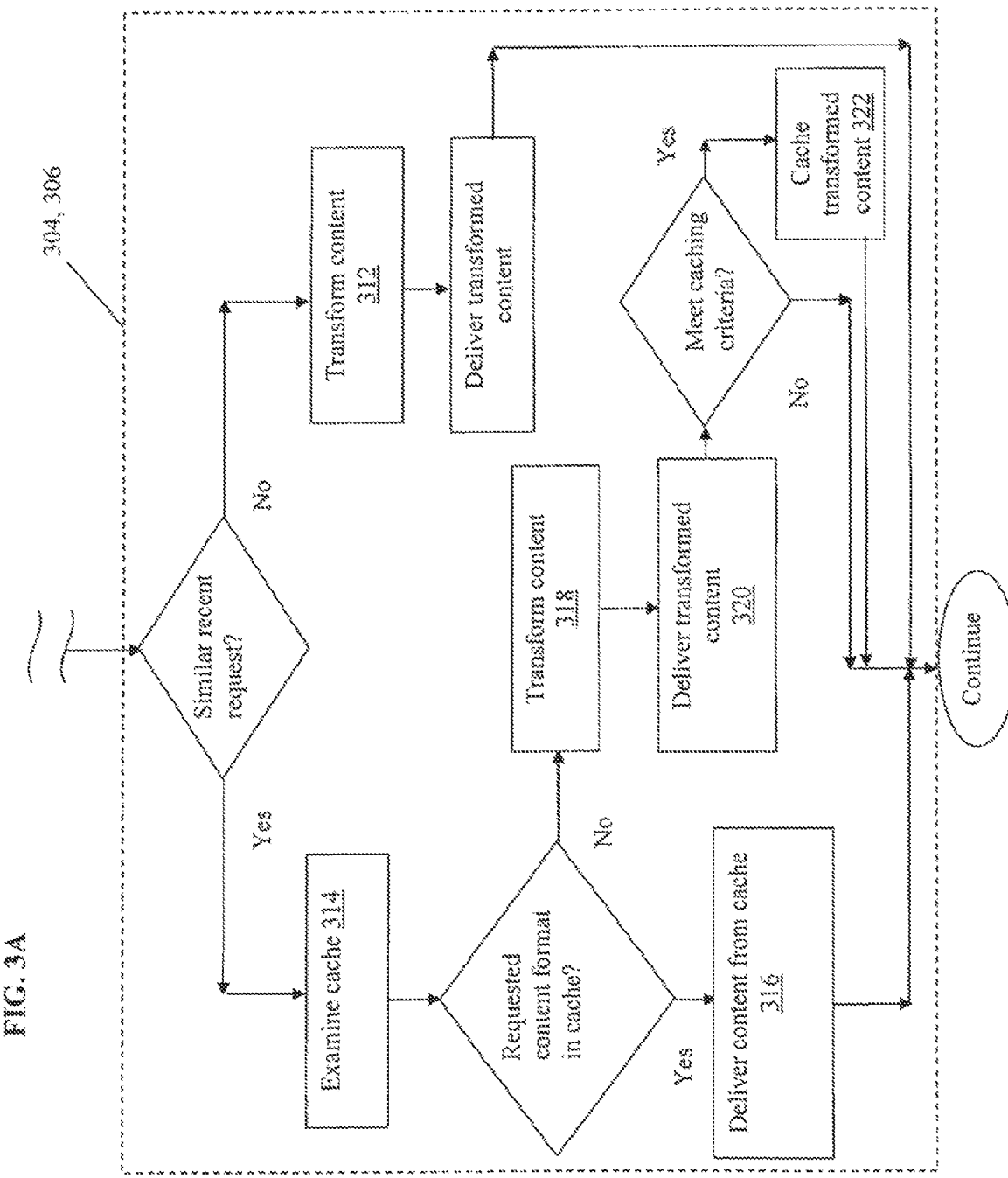
FIG. 3A is a logical flow diagram illustrating one implementation of the generalized methodology of FIG. 3.
Figure 3B:
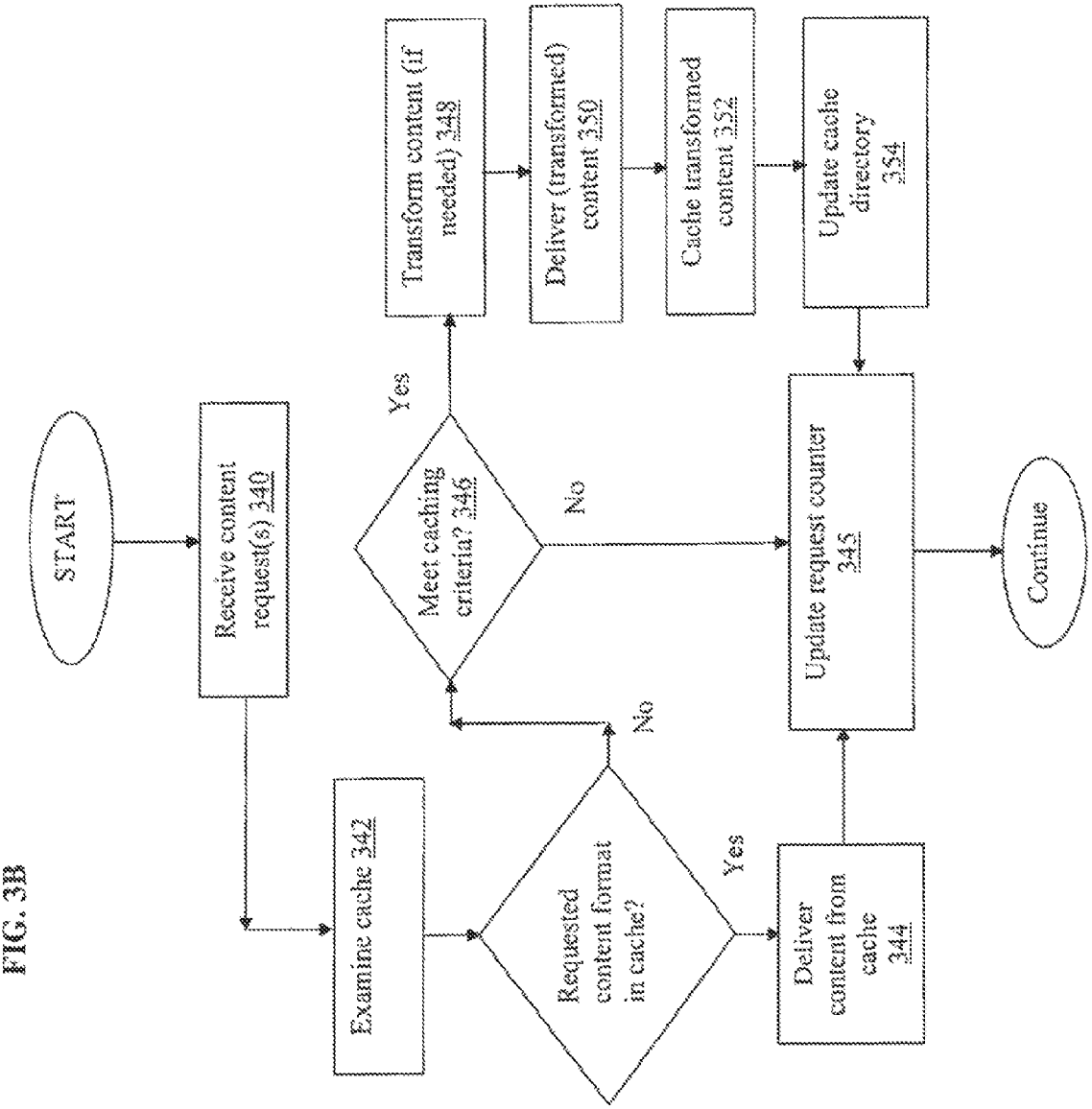
FIG. 3B is a logical flow diagram illustrating another embodiment of the content caching methodology according to the invention.

For example, as shown in the exemplary implementation of FIG. 3A, if the foregoing evaluation regarding recent requests per step 304 indicates that no similar recent requests exist, then the requested content in the required format is likely (or certainly) not in the cache storage area, and hence a direct transformation (i.e., transcoding, transrating, and/or transcrypting) and delivery is selected (step 312). Alternatively, if the evaluation indicates that similar requests have been recently received, the CC 208 will (i) direct the GSRM 237 or other relevant process to examine the cache for the requested content in the requested format (step 314), and either deliver the content from the cache without transformation if it is located (step 316), or transform and deliver the content in real time if it is not located (steps 318 and 320); and (ii) if the content is not presently in the cache per step 314, determine whether the transformed content should be cached so as to ostensibly service subsequent requests (step 322).

In the foregoing implementation, anecdotal "popularity" of sorts (e.g., how frequently/recently a given content element in a given form is requested for delivery) is used as a caching determinant criterion. This approach has the advantages of simplicity and passivity; i.e., the calculations and processing regarding determinations of popularity are relatively simple, and the inputs necessary to perform such calculations are obtained entirely passively (such as from upstream tuning or delivery requests sent to the MSO from the subscriber's CPE, PC, etc.).

However, it will be appreciated that other caching determinants may be used, whether alone or in combination. For example, determinants or criteria for consideration by the CC caching algorithm might include without limitation: (i) historical data or patterns; (ii) particular profile data for one or more subscribers or their CPE 106; (iii) errors logged on the CPE; (iv) date, time of day or presence of holidays or other special events.

Specifically, in one variant, historical data or patterns relating to the requesting subscriber, groups of subscribers in the network, or even larger subsets of the population (including those outside of the MSO subscriber pool) may be used. For example, the historical tuning or request (e.g., VoD request) history of a subscriber can be evaluated and used as a basis for predictive caching or "focus" (i.e., reducing the population of content elements that are eligible for caching, thereby ostensibly reducing processing overhead and latency). This may be implemented in an individual or group fashion. For instance, when a particular subscriber's CPE 106 is energized, they may be marked as "eligible" for submitting a content request. If that subscriber has very recently requested a content delivery (e.g., movie), it can be presumed that they will not request another content element delivery for at least a period of time.

Similarly, past selections of particular content elements for a subscriber may be reviewed and used as a "mask" of sorts; i.e., it can be surmised under one CC rule that there is a low probability that the subscriber would request that same content element again (or at least within a certain time frame of the prior request), and hence such content elements can be masked (or at least weighted less for selection) than other content elements that have not been selected.

In another variant, particular profile data for one or more subscribers or their CPE 106 (e.g., demographic or psychographic data, codec types or other capabilities of the CPE, types of other connected devices such as a DVRs, WiFi hub or AP, MoCA, FireWire or USB port, etc.) can be used as a basis for the CC 208 caching logic. If for example the MSO (CC) knows that all CPE 106 online at a given time are MPEG-2 decode capable only, then caching of AVC/H.264 versions of "popular" content would have little or no utility (recognizing that a subscriber may however spontaneously connect an AVC/H.264-enabled device to the network at any time, or make a "pass-through" request via the CPE, such as via the converged premises device (CPD) described subsequently herein).

Similarly, if the MSO knows from its subscriber database or other such data (e.g., historicals) that most of the subscribers who are avid golfers or golf enthusiasts are currently online or utilizing their CPE (such as via channel change commands, heartbeat from the CPE indicating that it is powered up, etc.), then the CC 208 might selectively prioritize caching content with golf-related themes (such as my be indicated by metadata associated with the content) in various formats in anticipation that there would be a greater-than-average demand for these titles as opposed to any others. Myriad other uses of information or data derived from network equipment or subscribers will be recognized by those of ordinary skill.

Also, errors logged on the CPE or other connected devices may be collected and evaluated by the MSO (or CC 208). This information may be useful from the standpoint of identifying events related to inability to decode content, inappropriate bitrate, unsuccessful conditional access, etc., thereby in effect specifying what does not work for a given device. For instance, if an MPEG-2 delivery was attempted to a particular device, but the stream was terminated due to a decoder incompatibility, decode error, or the like, then the CC 208 could surmise that the relevant device does not have an MPEG-2 decoder, and hence (i) subsequent delivery requests by that device should not be in MPEG-2 form; and (ii) caching of content should not be based on requests from that device, since they are inaccurate or unreliable (at least as to the encoder attribute).

In yet another variant, analysis of the date, time of day, or presence of holidays or other special events can be evaluated by the MSO (or CC 208) in implementing the caching logic. For instance, in some cases it can be reliably projected that the popularity of a given genre or title will vary as a function of time of day (e.g., requests for adult content are likely to increase later at night, while requests for cartoon content or that targeting children may increase markedly on Saturday morning, etc.). Similarly, holiday-related titles will be more popular on the relevant holiday (e.g., It s a Wonderful Life on Christmas).

Various other historical and/or predictive approaches may be used consistent with the present invention, For example, the MSO can associate a given subscriber/CPE with particular historical viewing habits (see, e.g., the methods and apparatus described in co-pending and co-owned U.S. patent application Ser. No. 11/243,720 entitled "SELF-MONITORING AND OPTIMIZING NETWORK APPARATUS AND METHODS" filed Oct. 4, 2005, which is now published as U.S. Patent Application Publication No. 2007/0076728, and patented as U.S. Pat. No. 8,582,584 on Nov. 12, 2013, and incorporated herein by reference in its entirety), whether on an individual basis (i.e., utilizing historical information for that particular subscriber/CPE), or on a generic basis (e.g., using data from that subscriber's service group, zip code, or the network/region as a whole). Predictive template or artifact matching may also be utilized to predict subscriber activity on an individual or group basis, as described for example in co-owned an co-pending U.S. patent application Ser. No. 11/800,093 entitled "METHODS AND APPARATUS FOR PREDICTIVE CAPACITY ALLOCATION" filed May 3, 2007, which is now published as U.S. Patent Application Publication No. 2008/0273591, and incorporated herein by reference in its entirety. Various other types of speculative or predictive approaches may be used with the present invention as well.

Data relating to particular subscribers can also be privacy protected if desired; i.e., at least a portion of the user information which could be used to personally identify a particular subscriber is first privacy-protected (e.g., hashed, scrambled, or otherwise enciphered). This process can be accomplished in a variety of ways. For example, in one embodiment, a one-way cryptographic hashing function is utilized, such as the hashing functions described in co-owned and co-pending U.S. patent application Ser. No. 11/186,452 filed Jul. 20, 2005 and entitled "METHOD AND APPARATUS FOR BOUNDARY-BASED NETWORK OPERATION," which is now published as U.S. Patent Application Publication No. 2007/0022459, is incorporated herein by reference in its entirety. In this fashion, the subscriber's personal tuning and viewing habits can be used by the MSO without necessarily knowing which subscriber these habits relate to. These techniques can also be used to isolate various groups of subscribers within the network; e.g., those within a particular zip code, such as for localized or "targeted" caching of content.

It will also be recognized that while the operation of the CC 208 in the previously described embodiment is effectively based on a two-dimensional matrix (i.e., content element identity or title versus encoding format), higher-order matrices or logical processes may be used. For example, the CC 208 might examine the content element/title, encoding format, and bitrate variables. Similarly, the encryption domain may be considered. A tuple or other such well known logical representation or data structure may be used for the purpose of identifying the various permutations associated with a content element, such as is shown in Eqn. (1):

$$P_{iC1} = \{c_i, b_i, e_i\} \qquad \text{Eqn. (1)}$$

where:
$P_{iC1}$=Parametric description of version i of content element C1
$c_i$=codec type for version i
$b_i$=bitrate for version i
$e_i$=encryption type/domain for version i Hence, it can be appreciated that in such a case where there are multiple options for each variable $c_i$, $b_i$, $e_i$, a large number of permutations of a given content element can exist. See, e.g., Table 1 below, which illustrates a small portion of such possible permutations for two exemplary content elements $C_1$ and $C_2$.

TABLE 1

| Content Element ($C_n$) | Version (i) | Codec (c) (0 = MPEG2; 1 = MPEG4; 2 = AVC/H.264) | Bitrate (b) (0 = 15 Mbps; 1 = 3.75 Mbps; 2 = 1.5 Mbps) | Encryption (e) (0 = None; 1 = DTCP; 2 = WMDRM) |
|---|---|---|---|---|
| $C_1$ | 1 | 0 | 0 | 0 |
|  | 2 | 0 | 1 | 1 |
|  | 3 | 2 | 2 | 0 |
| $C_2$ | 1 | 0 | 1 | 0 |
|  | 2 | 2 | 2 | 2 |

Probabilities of selection may also be assigned to the various options for each variable. For example, if a statistical analysis of the network indicates that on average, 9 of every 10 subscriber's CPE within the network has MPEG-2 decode capability, the "MPEG-2" option for variable "$c_i$" could be assigned a proportional weight or probability (e.g., $p_1 = 9/10$ or 90%). Similarly, if a particular bitrate was most popular or prevalent (e.g., HD capability comprised only 25% of network subscribers), then similar weighting could be assigned. The CC 208 may then, according to one variant of the invention, invoke an algorithmic scheme wherein the version of a content element (e.g., $C_1$) selected for caching is selected based on the highest aggregated or multiplicative probability associated with its parametric description, such as in Eqn. (2) below:

$$p_{aiC1} = \{p_{ci}, p_{bi}, p_{ei}\} \qquad \text{Eqn. (2)}$$

where:
$p_{aiC1}$=aggregated probability of version i of content element C1
$p_{ci}$=probability of codec type for version i
$p_{bi}$=probability of bitrate value for version i
$p_{ei}$=probability of encryption type for version i For example, if first, second and third versions of the same content element $C_1$ have an overall probability ($p_{aiC1}$) of selection of 0.7, 0.6, and 0.3 respectively, the CC 208 would select the first (0.7) version for caching since it is most likely to be requested, all else being equal. However, as previously noted, if other information is available (e.g., that only CPE 106 or PCs having H.264 encoders are presently online within the designated target group, then the aforementioned selection based on probability may be affected. Specifically, in this case, the probability coefficient for the encoder variable $c_i$ would be adjusted such that the H.264 option is given a value of p=1.0 or 100% probability, which may cause the overall or aggregated probability for one or more versions to increase, thereby potentially altering the order of selection by the CC 208.

The foregoing approach may be particularly useful where cache storage room exists for a limited number of versions of a given "popular" content element, and the CC must intelligently select which versions are most suitable for the prevailing (or projected) network conditions and viewing subscriber pool.

It will also be appreciated that where multiple content elements are requested, the relative popularity of a given content element may need to be balanced against available cache storage and the popularity of other programs. Specifically, the CC 208 of the exemplary embodiment must decide whether to cache two or more versions of a given content element, or rather cache one or more versions of another "popular" content element instead in the case where cache storage is constrained. Stated simply, not all versions of all content elements can be cached (rather in practice, typically only a small subset may be cached), and hence the relative popularity of each version of multiple different content elements can be evaluated. For instance, if Pirates of the Caribbean comprises the most requested content element during a given time period, and the movie 300 the next most frequently requested, the CC 208 may be forced to choose between (i) adding additional versions of Pirates of the Caribbean to the cache, and (ii) adding one or more versions of 300 to the cache. Analysis of the requests for each of the aforementioned movies during the relevant period may yield that the requests were heavily weighted toward MPEG-2 encodings at standard definition. Hence, it would typically be more efficient in such a case to add at least the MPEG-2 SD version of 300 to the cache before any further versions of Pirates of the Caribbean were added, since more prospective requests could be serviced from the cache with the MPEG-2 version of 300 than say an AVC/H.264 version of Pirates of the Caribbean. However, the next most popular request after the MPEG-2 version of 300 may be e.g., the AVC version of Pirates of the Caribbean. Hence, a version-by-version analysis of the various requested content elements may be employed for determining and dynamically varying the contents of the cache.

It may be the case that most popular (i.e., frequently requested) content element is distributed across multiple {c,b,e} options. For example, Pirates of the Caribbean may be the most requested content element, but the requests may be in general somewhat evenly distributed across the various {c,b,e} options. Hence, the CC 208 may utilize available caching space to load multiple versions of Pirates of the Caribbean based on order of request frequency, and then if additional cache space is available, load one or more versions of the next most popular content element, and so forth.

As previously noted, the exemplary embodiment of the present invention seeks in effect to strike a balance between reducing transformation requirements and latency, and reducing cache storage requirements. However, this balance may be varied dynamically and adaptively by the CC 208 as a function of time and/or changing network conditions, which may include available cache space, the present need for the various different options within a {c,b,e} variable, network bandwidth constraints, new operational or revenue goals, and so forth. For example, where available cache storage is effectively unlimited, the CC 208 may dynamically increase the number of different versions of a popular content element so as to avoid transformation processing to the maximum degree (the "saved" processing overhead being available for other tasks, or to permit equipment to be taken offline). Alternatively, where cache space is limited, the CC 208 might reduce the number of versions. As previously discussed, such dynamic increases or reductions may be based on any number of different factors such as e.g., a priori knowledge of the capabilities of devices presently coupled to the network. For instance, an AVC-encoded version of a content element would likely not be requested if none of the subscribers in a service group are operating AVC-enabled devices (although an AVC device could be spontaneously coupled to the CPE or another network interface). Similarly, if all or most subscribers in a service group have "near-HD" upconversion capability, and bandwidth and/or cache storage space are limited, then an SD-encoded version of a program could be selected for caching, since it would in effect deliver HD quality with much less network "cost". Accordingly, the present invention further contemplates the use of cost/benefit analyses (whether based on operational considerations, business considerations, or both) as part of the CC 208 caching logic.

Figure 3C:
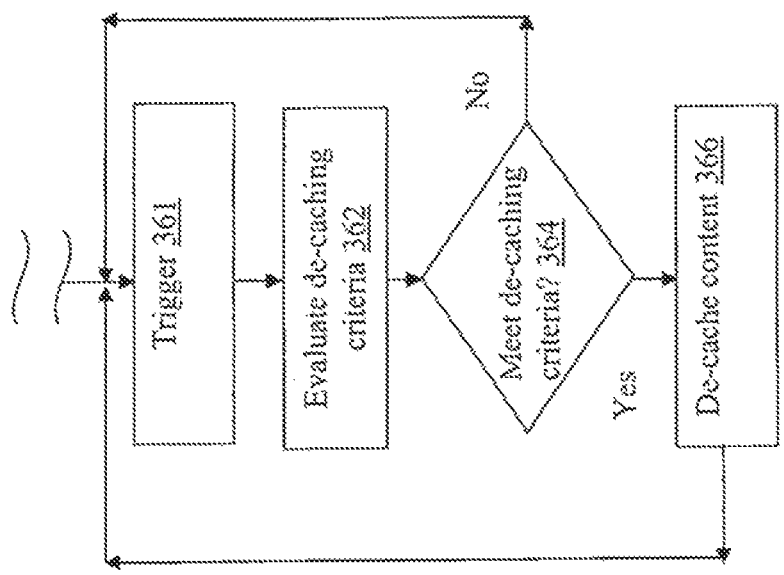
FIG. 3C is a logical flow diagram illustrating one embodiment of the content de-caching methodology according to the invention.

As part of the dynamic and adaptive operation of the CC 208 discussed above, de-caching logic is also provided; see inter alia the discussion provided subsequently herein with respect to FIG. 3C.

It will also be appreciated that "asymmetric" results or effects associated with two or more different options that may be selected by the CC 208 can be considered in pre-fetch or caching determinations. For instance, the benefit of experiencing a cache "hit" (i.e., having one or more subscribers request content which was cached) at a given time may be different in magnitude, importance, cost, etc. than the detriment in experiencing a cache "miss" request for un-cached content) at that same point in time. Moreover, this relative relationship between benefit and detriment for the hit and miss, respectively can vary significantly as a function of time due to e.g., changes in available bandwidth, total demand, mix of the demand (e.g., BSA versus VoD), RTA costs, etc.

In another variant of the caching methodology (FIG. 3B), the CC 208 receives a request for a particular content element (step 340) from a subscriber. A cache database directory or other such data structure is then searched for the requested content (or content version having particular attributes, as described subsequently herein) per step 342. Various arguments can be used as the search criteria, including e.g., a content ID number uniquely associated with a particular title or version, a plaintext or human readable description (such as in the form of metadata), codes indicating various attributes (e.g., binary bit combinations indicative of various different codec, bitrate, and/or encryption options), etc. Those of ordinary skill in the computer database arts will readily recognize a plethora of different means by which such searching can be performed.

If the requested content is found in the cache, the content is served per step 344 from the cache (e.g., re-ingested into the VoD server 105), and a counter function or module within the CC 208 updated to reflect the request per step 345. If the content is not found in the cache, the CC 208 next examines whether the relevant caching criteria (e.g., that particular content element has been requested by one or more other subscriber(s) within the target population within a prescribed interval or period of time) per step 346. In this case, the "target population" may be for example subscribers: (i) within the same MSO network; (ii) within the same subportion of the MSO network (e.g., served by the same hub, same service group, etc.); (iii) those sharing a common attribute (e.g., same zip code, same demographic or psychographic category, same type of CPE, subscription level, etc.), and so forth. Hence, the CC 208 can advantageously base its caching decisions on anything ranging from the entire MSO network to small subsets thereof, or even individuals, and this parameter may be made dynamically variable by the MSO or even by the CC 208 itself.

The determination of step 346 may be conducted by, e.g., accessing the counter function or module within the CC 208, which counts the number of requests for a particular content element (whether based on title/content of that element alone, or also on its attributes such as encoding, etc., as described subsequently herein). Other approaches may be used as well.

Next, if the examination of step 346 indicates that the necessary caching criteria are met (e.g., a match exists between the present content request and a prescribed number of prior requests falling within a prescribed timeframe or window), then the CC 208 will direct the VoD server or other relevant device to service the present request per step 350 (which may include transforming the content per step 348), cache the content being provided per step 352, and update a database directory or other accessible record to reflect the presence of the content in the cache (and also its attributes) per step 354. The counter function is also updated per step 345.

Alternatively, if the caching criteria are not met per step 346, then the CC 208 does not cause the content to be cached, and further updates the counter function per step 345 to reflect the occurrence of that particular request (and its attributes).

In one variant, the CC 208 (with assistance from the GSRM) monitor content element and client type usage. Popular content elements meeting caching criteria may optionally be assigned one or more "temporary" asset classifications, which allows the CC 208 to delineate or differentiate between cached content elements that are to be treated differently. For example, a set of condition codes or the like (e.g., one or more binary bits) can be assigned to content such as to impose a priority or order of de-caching. The MSO might desire to impose a de-caching hierarchy or priority scheme based on any number of different considerations including, e.g., profit or revenue, maintenance or failure of certain transformation (e.g., transcoding) resources, bandwidth or other operational factors, and so forth. Hence, all else being equal, the CC 208 would prioritize removal or de-caching of certain content elements over others based on these condition codes.

As noted, these condition codes may be temporary in nature, and even dynamically varied as network/subscriber conditions change. Hence, one variant of the invention utilizes a module within the CC 208 periodically re-evaluate and adjust condition codes associated with cached content as required by then-prevailing, or even anticipated future conditions.

Additionally, the condition codes or a similar mechanism can be used to segregate content; i.e., partition the cache space or portions thereof into two or more subsets. This partitioning may be used for, e.g., separating cached content that is available for delivery (serving) versus that which is not, delineating subsets of the cache storage volume for maintenance, troubleshooting, or management (e.g., disk defragmentation, etc.), segregating content by type (e.g., adult versus other), and any number of other reasons.

Moreover, cache storage may be implemented as banks of storage space dedicated to certain type and/or attributes of content. For example, one storage bank may be dedicated to the most recently watched or popular content elements, while other banks are dedicated to less popular content. The "popular" bank may have enhanced performance, reduced latency, etc. since it is most likely to be accessed. As another alternative, all HD content might be maintained in one bank, with all SD content in another bank (so as to leverage commonalities associated with processing the different resolution content). As yet another alternative, all content encoded with a certain type of codec (e.g., MPEG-2) could be stored in a first bank, all AVC/H.264 content in a second bank, and so forth. Hence, the cache can be organized along literally any logical dividing line that to effectuate the desired goals of the CC 208 and MSO and make use of any economies or scale or commonalities in processing.

As previously noted, the database search of step 342 and/or the caching criteria examination of step 346 may be based purely on the content element (i.e., evaluating the title, content ID, metadata, etc.) irrespective of the coding/bitrate/encryption environment of that content element, or alternatively one or more of the foregoing attributes can be evaluated as well. In the former case, the determination of a cached content element or prior request for the content element (irrespective of other attributes) can be used as an input to the CC's logical process, which then invokes an algorithm that makes caching decisions based on other criteria (e.g., predictive or historical paradigms, signals or data obtained from the subscriber's CPE or the network, etc.) as described in detail elsewhere herein. Hence, the CC logic might determine whether any version of the requested content element has been cached per step 342, and then take action accordingly (e.g., transform that cached version into the format required by the pending request, as opposed to transforming an ingested "source" version).

Alternatively, the latter approach of evaluating the title and also the other attributes of the content element can be used in one variant as an end result; i.e., if the evaluation indicates a match based on title and other attributes such as encoding, bitrate and encryption environment, then the caching decision is made based thereon.

The present invention also contemplates the ability of the CC 208 to evaluate one or more cached versions of a particular content element for possible transformation, as opposed to using the source content (e.g., that ingested via an interface to a third party content source or the like). For example, it may be that a cached version of a given title does not exactly match the requested format associated with a current request, but it none-the-less can be more efficiently or easily transformed than could the "source" content. This might be the case where, e.g., the transformation assets (such as an transcoder or transrater) necessary to transform the source content are unavailable or over-utilized, or alternatively where increased content quality loss would occur if the transformation from the source content were performed.

Similarly, where all but one of the attributes matches, it may be more desirable to make the transformation from a cached version rather than the source version. For instance, where the title, encoding scheme, and bitrate match, but the encryption scheme does not, it may be more efficient to tran-scrypt (e.g., decrypt and re-encrypt according to the new scheme or key) as opposed to possibly transcoding/transrating, and transcrypting the source content.

It will be apparent that many different variations and permutations of this decision process will exist, depending on the format of the "source" content versus that of the nearest cached content, as they both relate to the requested content format. For example, the request for content may be for an AVC/H.264 format at 2.0 Mbps with WMDRM. If the "nearest" (i.e., logically or closest matching) cached version comprises the same title encoded in AVC/H.264 at 2.0 Mbps yet with another DRM scheme, and the source content is MPEG-2 encoded at 3.75 Mbps with WMDRM, it may be more efficient for the CC 208 to transcrypt the nearest cached version to WMDRM, as opposed to transcoding from MPEG-2 to AVC, and transrating from 3.75 Mbps down to 2.0 Mbps. However, if the nearest cached version is also MPEG-2 encoded at 3.75 Mbps with a non-WMDRM scheme, it is more efficient to transcode and transrate the source content, since it is more "proximate" in $\{c,b,e\}$ space to the request than is the cached version.

"De-caching" (i.e., removal or expiration of a given content element version within the cache) policies are also implemented by the CC 208 of the present embodiment. Specifically, such de-caching is necessary to police systems with limited cache resources (or even those where unbridled caching will cause a deleterious or undesired effect, such as increased latency due to having to search the cache directory for a particular version of a content element from perhaps millions of different titles/versions). This also becomes increasingly important as the depth or complexity of caching is increased; i.e., as more sophisticated or complex searches are used (e.g., a search for Title A having associated metadata matching argument B and encoding type C with bitrate D and encryption type E, etc.).

In one embodiment of the invention, a de-caching operation (FIG. 3C) is invoked after a trigger occurs per step 361 (e.g., expiration of a timer, reaching a certain fullness level in the cache storage volume, etc.), and one or more de-caching criteria are evaluated (step 362) and met (step 364). These may include, for example: (i) the content element (version) is already cached; (ii) an actual or projected decline in the popularity of or number of requests for the content element (e.g., Valentine's Day has passed, so fewer requests for romantic content titles of any version are anticipated); (iii) an actual or projected decline in the number of requests for particular versions of content (e.g., after a certain time of day, most content requests are for MPEG-2 encodings, irrespective of the identity of the content element/title); (iv) the cached version is particularly storage-space intensive as compared to other versions or content elements, yet no more transformation-intensive; (v) search and/or retrieval latency is becoming unacceptable due to too many titles/versions being cached; and so forth. Myriad individual criteria or combinations of criteria will be recognized by those of ordinary skill given the present disclosure.

When the relevant de-caching criteria are met per step 364, the CC 208 will remove the specific cached version from the system to recover storage space (step 366). This removal may be immediate (e.g., where the file is immediately removed from the storage device via deletion or movement), such as by marking or designating a database entry associated with the version as no longer accessible, and then allowing the associated storage area with that content element to be written over, much as a PC HDD removes one or more characters of a file name which than makes the file inaccessible, and associated sectors of the HDD available for write-over.

In another variant, versions of content that are no longer required may be removed by attrition using a "dead man switch" approach; i.e., the content version is automatically removed according to a schedule or upon the occurrence of an event (e.g., expiration of a timer) unless that version is affirmatively "reset" by the CC 208, such as where there is continued demand for that version, and its presence in the cache continues to provide benefit for the MSO.

It can be seen from the foregoing discussion that the efficacy of the "attribute matching" approach is to a large degree tied to the existence of statistical features or probabilities within the subscriber pool. Specifically, in the case where most all subscribers are heterogeneous in terms of their content requests (i.e., most everyone was requesting a different content element, or rather the same content element but that uses a different codec, bitrate, and/or encryption or security environment), the positive effect of caching would be minimal, since most every new request would need to be transformed to meet the differing requirements thereof.

However, where significant commonality in the form and timing of content requests exists, this commonality can be exploited. For example, in the hypothetical case where most all content requests were for the same content having the same attributes, and were received at generally similar times, then the caching methods of the present invention would greatly enhance network efficiency, since most requests would be repetitively serviced using one or a small number of cached versions of the requested content element. Hence, in the instance where a very popular content element is repeatedly requested by subscribers having similar CPE 106 or other target platforms (e.g., all have the same codec, can utilize the same bitrate/resolution, and the same encryption or CA environment), then significant gains can be realized. This condition of "similar requests from similar devices" may exist in many content-based networks to a large degree, since the MSO or other network operator is to some extent in control of the CPE or other devices used by the subscriber.

Clearly, actual every-day operation of the typical MSO network will fall somewhere between these two extremes (i.e., complete heterogeneity and complete homogeneity); but to the degree that any of the foregoing commonalities exist, the network can benefit from the attribute-matching caching approaches described herein.

As the heterogeneity of devices increases (e.g., more non-MSO prescribed devices are coupled to the network), the efficacy of the caching approach may be reduced somewhat. However, it is important to note that the performance received from caching even under such heterogeneous environments will still exceed that of a similar network without caching, since under the latter (prior art) approach, each new request that differed from the baseline or "source" content parameters would need to be transformed, irrespective of whether it had recently been transformed in a similar fashion or not. Stated simply, the caching approach of the present invention will always provide some benefit; the degree of that benefit, however, is dependent in large part on (i) the heterogeneity of the target device environment, and (ii) subscriber behavior (e.g., popularity of specific content titles, etc.).

It will also be appreciated however that as interest from similar hosts/devices increases in a particular content element, the caching approach will become more efficient in the use of network and transformation (i.e., transcoding/transrating/transcrypting) resources. Hence, there will often be a dynamic variation in efficiency with time; e.g., as the popularity of a content element increases due to for example advertising or promotion, word-of-mouth, or even changes in time of day or day of the week. For instance, the popularity of a given title may increase significantly concurrent with release of the content via the network, the occurrence of related current events (e.g., the movie Independence Day might be in high demand if/when aliens first visit Earth, etc.), holidays, etc. Similarly, the popularity of a specific version of a content element might increase markedly when that version is released; e.g., the availability of an iPod™- or iPhone™-friendly version of a full-length movie over the MSO network. When such increases in popularity occur, they can be readily exploited through "intelligent" caching behavior as described herein.

Referring now to FIG. 3D, another embodiment of the methodology of the present invention is described. Specifically, the method 370 of FIG. 3D is used for determining and utilizing decoding, bitrate, and/or DRM capabilities of the CPE 106 or other device connected to the network (e.g., PC, handheld, etc.). This is in contrast to the purely passive methodology described above with respect to FIG. 3.

As used in the present context, the term "connected" refers without limitation to any devices which are in direct or indirect data communication with the CPE 106 or the network 101, whether in direct physical contact or not.

In a first step 372, the method 370 comprises obtaining information regarding codec, bitrate, and/or DRM/CA capabilities from the device of interest. This can be accomplished in one variant using a network process (e.g., GSRM 237 or CC 208) that is configured to generate (or cause to be generated) a polling message or query and transmit this to the relevant CPE 106 or connected device. The CPE 106, device, or its proxy then provides the requested profile information, and transmits it back to the GSRM or CC 208 or a proxy thereof. The CC 208 may also comprise a client portion operative to run on the CPE 106 or client device as discussed below and with respect to FIGS. 4A-4d.

In another variant, the GSRM or CC 208 accesses a local database having pre-stored information relating to the CPE/client device capabilities. For example, the subscriber account associated with the CPE of interest may have information relating to the CPE and other devices within the end user domain (e.g., subscriber's premises), such as may be provided by the subscriber at account or service establishment (e.g., via a survey, network profile "wizard" running on the CPE, etc.), or passively over time as the CPE of that subscriber interfaces with the network. A converged premises device (CPD) acting as a gateway or centralized interface within the user domain for example may be configured to obtain information from any connected devices (e.g., a PMD plugged into a port of the CPD, or a WiFi enabled laptop or handheld that registers with the CPD acting as an 802.11 AP) and store this information locally or transmit it upstream to a network process. The various end user devices may have an indigenous ability to communicate with the CPE/CPD for this purpose (such as via software, etc. installed by the manufacturer, or according to a requisite interface standard or protocol used by the device), or alternatively the subscriber may load an application onto each device to permit it to communicate with the CPE/CPD (or even the network GSRM or CC 208 directly). In one variant, the CPE/CPD or client device is configured to automatically download this application onto the connected device when the two interface for the first time, thereby obviating user intervention. For instance, a small client application might be loaded onto the client device that allows for the determination of hardware and/or software on the client device, such as via a hardware or software registry or other such mechanism.

Next, per step 374, the GSRM or CC 208 evaluates the data obtained regarding the CPE 106, and establishes a profile for the CPE 106 in terms of the capabilities of interest. In one embodiment, the capabilities of interest comprise the video codec, bitrate, and encryption/DRM support of the CPE (or the client device).

Pert step 376, the generated profile is then used as an input to the GSRM/CC process used select an appropriate content element for caching as previously described.

The exemplary methods and apparatus of co-owned U.S. patent application Ser. No. 11/904,408 filed Sep. 26, 2007 entitled "METHODS AND APPARATUS FOR DEVICE CAPABILITIES DISCOVERY AND UTILIZATION WITHIN A CONTENT-BASED NETWORK", which is now published as U.S. Patent Application Publication No. 2008/0201748, and patented as U.S. Pat. No. 8,458,753 on Jun. 4, 2013, is incorporated herein by reference in its entirety, may also be used for obtaining information relating to CPE or client device codec, resolution, bitrate, etc. capabilities, and selecting an appropriate version of requested content therefor.

In the context of delivery of packetized IP-based content (such as IP TV, etc.), the caching techniques and apparatus described herein may be used in conjunction with network bandwidth management techniques such as e.g., those described in co-owned U.S. patent application Ser. No. 11/325,107 filed Jan. 3, 2006 and entitled "METHODS AND APPARATUS FOR EFFICIENT IP MULTICASTING IN A CONTENT-BASED NETWORK", which is now published as U.S. Patent Application Publication No. 2007/0153820, and patented as U.S. Pat. No. 7,693,171 on Apr. 6, 2010, is incorporated herein by reference in its entirety. Specifically, the disclosed methods and apparatus are directed to eliminating or reducing wasted bandwidth associated with multicasting packetized content and thereby increasing the overall efficiency of the network. In one exemplary embodiment, the subscriber's cable modems are switched selectively among different downstream QAMs in similar fashion to the broadcast switched video previously described herein with respect to FIG. 1C, thereby allowing for reduction in the total number of QAMs required to service the DOCSIS functionality (which may include both traditional IP-based network services, as well as high-bandwidth video or "IP TV" content). Advantageously, these cable modems can be rapidly switched with no re-ranging or registration, thereby allowing for a substantially seamless and low-overhead switching transient which is transparent to the user. The foregoing approach is particularly useful in the content of IP or similar "multicast" content that is targeted for multiple subscribers. Under the prior art, multicasting of such content would consume significant amounts of bandwidth on the downstream channels, since the multicast content was essentially replicated for each different subscriber. In contrast, the aforementioned apparatus and methods allow this multicast content to be delivered to multiple subscribers by selectively tuning the subscribers to common channels where the content is already being delivered to other subscribers, thereby allowing for a 1:N expansion of the content with minimal if any replication. This further leverages the "caching gains" afforded by the present invention, since by combining both techniques, (i) cached versions of content can be re-used multiple times (thereby obviating transformation), and (ii) the cached versions can be "multicast" by steering requesting subscribers to a smaller number of QAMs where the requested content is being delivered, thereby conserving downstream bandwidth.

It will also be appreciated that the caching techniques and apparatus described herein may be used consistent with a peer-to-peer (P2P) delivery paradigm. See, for example, co-owned and co-pending U.S. patent application Ser. No. 11/726,095 filed Mar. 20, 2007 and entitled "METHOD AND APPARATUS FOR CONTENT DELIVERY AND REPLACEMENT IN A NETWORK", which is now published as U.S. Patent Application Publication No. 2008/0235746 and is also incorporated herein by reference in its entirety. Specifically, one or more "peers" within a network can utilize a local caching controller (CC) 208, somewhat akin to the embodiment of FIG. 4B discussed previously herein, yet in the context of a peer device versus distribution hub. One variant of this architecture comprises using CPE or client devices to act as peer content providers for one another. This peer relationship may be as simple as one device with certain content (or portions thereof) providing that content to another device. More sophisticated variants of the invention employ the use of multiple source peers (and in some cases multiple requesting or "sink" peers), as controlled by a server process. This P2P approach has many potential benefits including, for example, the ability to push at least some network bandwidth consumption out to the edge of the network (e.g., hubs or other distribution nodes), thereby conserving bandwidth at the core of the network, the latter which can often be the most critical or bandwidth constrained portion of the system. Moreover, requests outside the MSO network are obviated, thereby conserving resources in this regard. Latency can also be reduced in some cases (e.g., where the network is over-subscribed), since the requested content is acquired and distributed locally versus having to come from the core (or a third-party content source routed through the core or other network infrastructure).

Since such peer devices invariably have limited cache storage capability, efficient management of these assets can further enhance the benefits provided by the distributed peer content serving architecture: e.g., by caching the most popular content versions for delivery to other peers.

Software Architecture—

Referring now to FIGS. 4A-4D, exemplary embodiments of the software architecture useful with the present invention are described in detail. It will be appreciated by those of ordinary skill that while four exemplary embodiments are described herein, other variations and combinations of the following architectures may be utilized depending on the desired attributes and network topology in use.

As shown in FIG. 4A, a first embodiment of the architecture comprises a network portion 402 of the caching controller (CC) 208, which effectively functions as a supervisory process, and is in logical communication with the GSRM and VoD server 105, and a cache content database 406, as well as other network equipment and processes (not shown) in order to effectuate the content caching methods and policies as previously described. For example, in one variant, the CC network portion 402 is in direct or indirect communication with the GSRM/VoD server (FIG. 2-2a) in order to implement caching and transformation policies. The aforementioned network portion 402 may for example be combined with other network management entities (including the GSRM), or may be stand-alone in nature.

As shown in FIG. 4A, not all "subnetworks" in the network need be included within the purview of the CC network portion 402; rather, the methodologies previously described may be implemented on a per-subnetwork (or per-node) basis if desired, although clearly the entire network can be included as well.

It is noted that in the embodiment of FIG. 4A, no dedicated client processes or portions (e.g., CPE software) are used; the CC network portion 402 analyzes data it obtains from the database 406 (or other such sources), such as the current directory of cached content versions and their attributes, available remaining cache storage space, etc., in order to implement its content caching policies. For instance, the CC network portion 402 may access the database 406 in order to determine a CPE or client device profile (including potentially codec capabilities, bitrate requirements, DRM, etc.) for each CPE 106 of interest. As previously described, the CC portion 402 can also optionally access historical tuning or other data so as to implement a predictive or "look-ahead" approach, both in terms of what a given subscriber (or group of subscribers) may request in terms of content elements, as well as future projected bandwidth demands and constraints (e.g., as a function of time of day, day of the year, and so forth).

As shown in FIG. 4B, a second embodiment of the software architecture comprises a plurality of CC network portions 402a, 402b, in this example disposed at the headend 150 and one or more hubs of the network, respectively. The various network portions 402a, 402b may also be in logical communication with one another (or at least the hub portions 402b with the headend portion 402a) as shown, thereby allowing for sharing of information. The aforementioned database comprises a plurality of local databases 406b, as well as a headend database 406a. These local databases 406b provide local (e.g., hub level) cache directory functions, etc., while the headend database 406a operates generally as in the embodiment of FIG. 4A. Use of hub network portions 402b as illustrated also allows for a finer level of control; i.e., each hub process 402b can in one variant control content caching for a local VoD or other application server (not shown) in a substantially autonomous fashion from other hubs if desired. This is to be distinguished from the embodiment of FIG. 4A, wherein the hubs have no innate "intelligence" of their own and are not involved in implementing the caching methodologies previously described.

Moreover, in the event of a failure or problem with the headend CC portion 402a, the individual hub portions 402b can continue to operate (and optionally communicate with one another directly), thereby providing a degree of fault tolerance and redundancy. To this extent, it will be recognized that another variant of the invention utilizes only the hub portions 402b (i.e., without the headend portion 402a) in this fashion, with either local individual databases 406b as shown, or logical connection directly to the "master" headend database 406a (not shown).

As shown in FIG. 4C, yet another embodiment of the software architecture of the invention comprises a headend CC portion or process 402a in logical communication with client (e.g., CPE) portions 404 disposed on all or a subset of the CPE within the network. Such subsets may be organized based on subnetwork/node as shown, or using another scheme. These client portions 404 act as remote proxies for the headend CC process 402a, allowing the MSO to control at least aspects of the operation of the CPE 106 having such client portions 404, including notably the collection of CPE configuration information, as well as historical data and other useful information from the CPE. This approach has the advantage that the MSO can gather much more accurate and relevant information about an individual CPE, including the operation thereof over time. For example, the headend CC process 402a can periodically poll the client portions to determine operational status, what channel is currently being tuned to, recent errors that have been logged (e.g., inability to play a certain format of content, resource contention, etc.), and even invoke corrective action if desired. For instance, such corrective action might constitute download of a new codec or driver, and/or destruction of an existing application on the CPE. Modifications or upgrades to the middleware or monitor application can also be performed based on data gleaned from particular CPE. The client portion 404 can also be used to generate notifications, interactive displays or queries on the user's display device or other output device. Hence, the optional client portion 404 of FIG. 4C provides the MSO with a "point of presence" within each CPE as well.

Figure 4D:
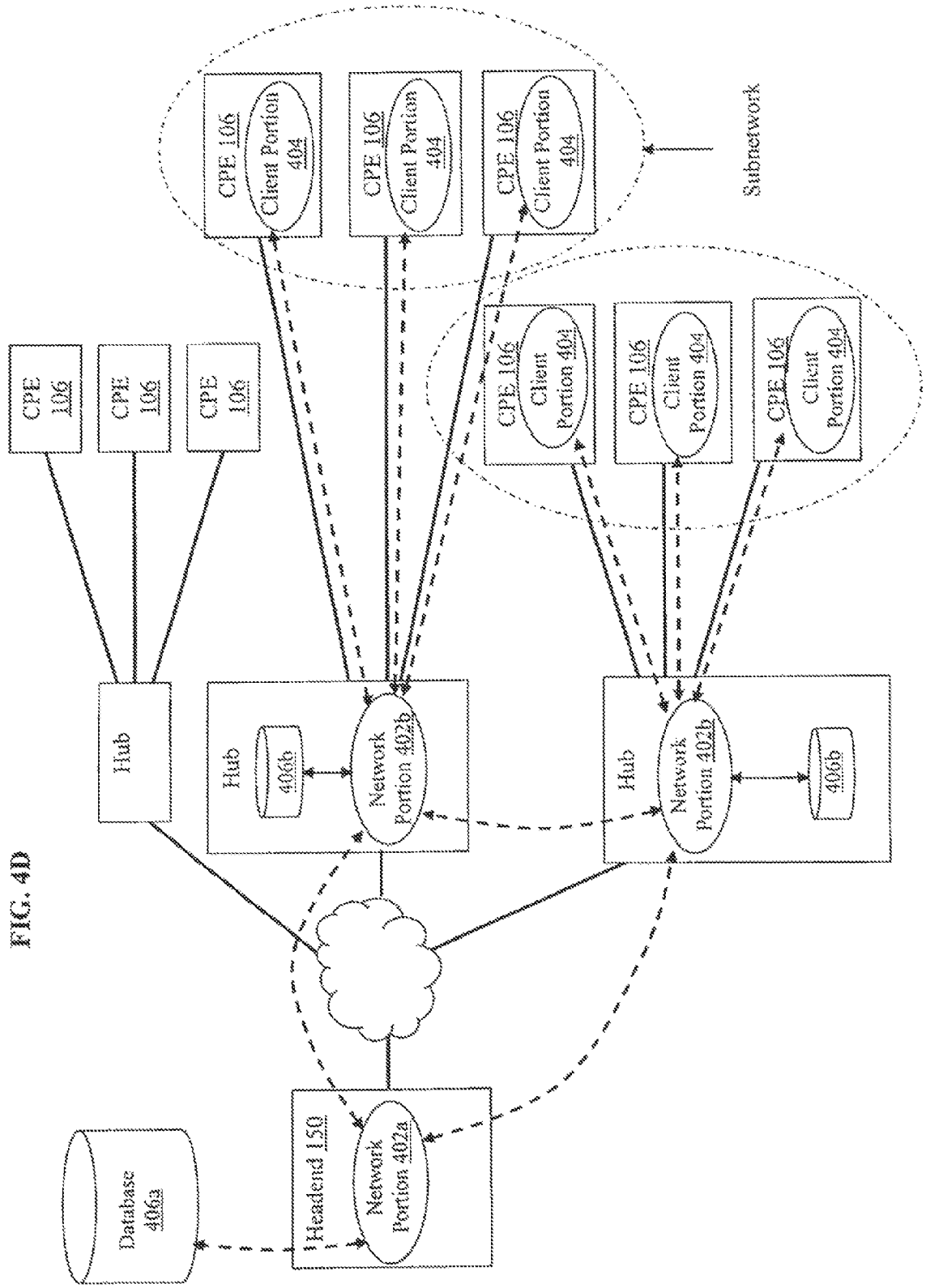
FIG. 4D is a block diagram illustrating a fourth exemplary embodiment of a network software architecture according to the present invention.

Referring now to FIG. 4D, yet another embodiment of the software architecture is disclosed, wherein both client portions 404 and headend/hub network portions 402a, 402b (and databases 406a. 406b) are utilized. This hybrid approach provides essentially all of the benefits of the embodiments of FIGS. 4B and 4C previously described, yet at the price of somewhat greater complexity.

Network Device—

Figure 5:
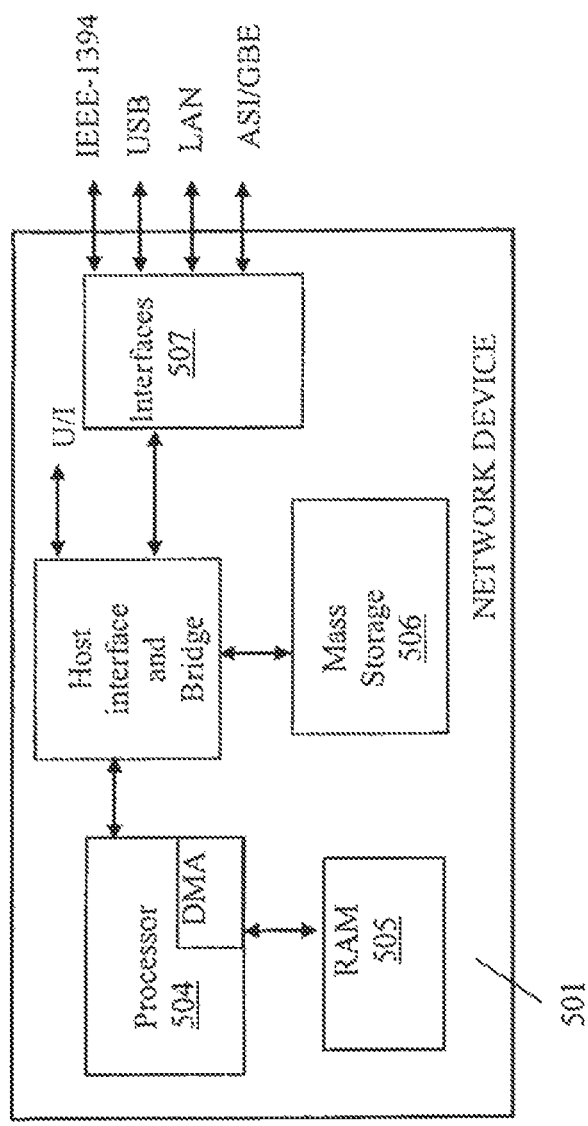
FIG. 5 is a functional block diagram illustrating an exemplary embodiment of a network device with content caching functionality according to the invention.

Referring now to FIG. 5, one embodiment of an improved network (e.g., control server) device with caching controller (CC) capability according to the present invention is described. As shown in FIG. 5, the device 501 generally comprises and OpenCable-compliant VoD server or controller module adapted for use at the headend 150 (see FIG. 1A), although the server may comprise other types of devices (e.g., BSA hub or application servers, GSRM or other supervisory processes, etc.) within the network as previously described.

The device 501 comprises a digital processor(s) 504, storage device 506, and a plurality of interfaces 507 for use with other network apparatus that may include GSRM functions, RF combiners, IP routers and other packet network devices, network management and provisioning systems, local PCs, etc. Other components which may be utilized within the network device 501 include amplifiers, board level electronic components, as well as media processors and other specialized SoC or ASIC devices. Support for various processing layers and protocols (e.g., LSCP, RTSP, 802.3, DOCSIS MAC, OOB channels, DHCP, SNMP, H.323/RTP/RTCP, VoIP, SIP, etc.) may also be provided as required, such as in support of data and "rules" interchange between the network device 501 and the GSRM or cached content database 406. The CC process software (e.g., the network portion 402a of FIGS. 4A-4D) is also disposed to run on the server module 501, and can be configured to provide a functional interface with the GSRM, and other headend and/or client processes 402a, 404 (where used), or other interposed or remote entities. These components and functionalities are well known to those of ordinary skill in the cable and embedded system fields, and accordingly not described further herein.

The device 501 of FIG. 5 may take any number of physical forms, comprising for example one of a plurality of discrete modules or cards within a larger network VoD server device of the type well known in the art. The server may also comprise firmware, either alone or in combination with other hardware/software components such as those previously described (e.g., disposed in the aforementioned edge device). Alternatively, the device 501 may be a stand-alone device or module disposed at the headend or other site, and may even include its own RF front end (e.g., modulators, encryptors, etc.) or optical interface so as to interface directly with various portions of the HFC network 101. Numerous other configurations may be used. The device 501 may also be integrated with other types of components (such as the GSRM, database 406, transformation devices 206, encoders/decoders, etc.) and form factors if desired.

It can also be appreciated that the methods of the present invention may be practiced using any configuration or combination of hardware, firmware, or software, and may be disposed within one or any number of different physical or logical entities. For example, the caching controller 208 functionality described above may take the form of one or more computer programs (e.g., the network and client processes, 402, 404). Alternatively, such computer programs may have one or more components distributed across various hardware environments at the same or different locations, such as where the network process 402 is distributed across multiple platforms at the headend 150 and one or more hub sites as shown in FIGS. 4B and 4D.

As yet another example, portions of the functionality may be rendered as a dedicated or application specific IC having code running thereon. Myriad different configurations for practicing the invention will be recognized by those of ordinary skill in the network arts provided the present disclosure.

CPE—

Figure 6:
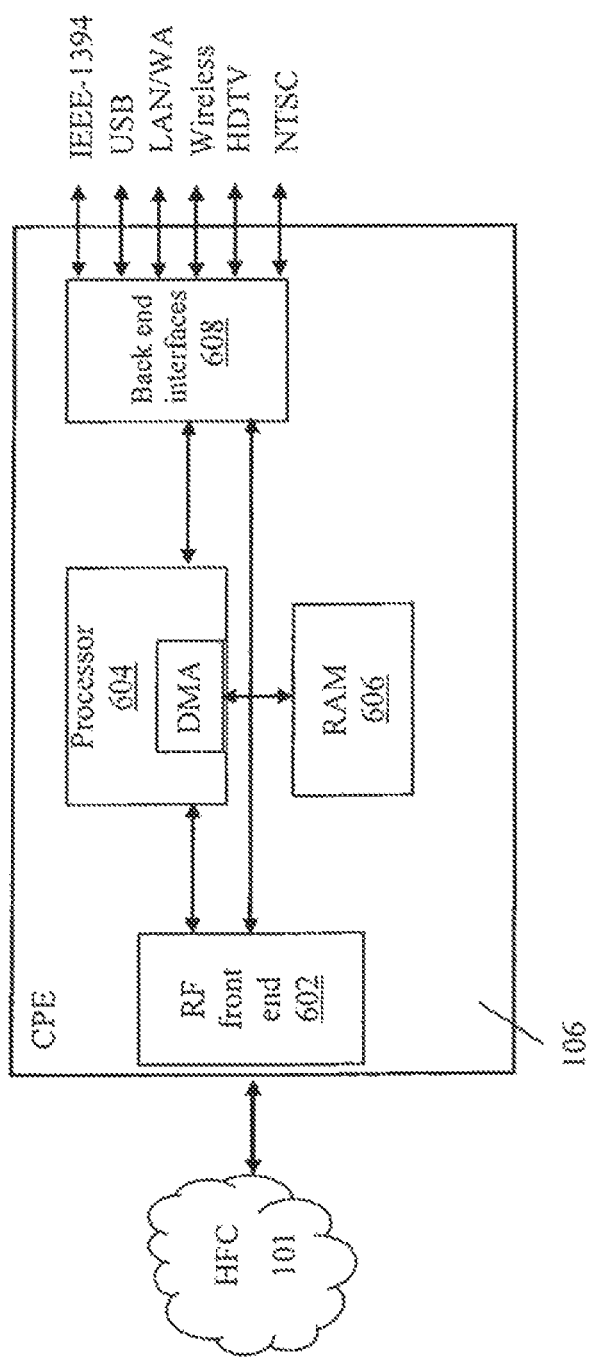
FIG. 6 is a functional block diagram illustrating an exemplary embodiment of CPE adapted to support network content caching functionality.

FIG. 6 illustrates an exemplary embodiment of the improved CPE 106 according to the present invention. As shown in the simplified diagram of FIG. 6, the device 106 generally comprises and OpenCable (OCAP)-compliant embedded system having an RF front end 602 (including tuner and demodulator/decryptors) for interface with the HFC network 101 of FIGS. 1-1C, digital processor(s) 604, storage device 606, and a plurality of interfaces 608 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 is also provided with an OCAP 1.0-compliant application and Java-based middleware which, inter alia, manages the operation of the device and applications running thereon (including the client process 404 where used). It will be recognized by those of ordinary skill that myriad different device and software architectures may be used consistent with the tuning functions of the present invention, the device of FIG. 6 being merely exemplary. For example, different middleware (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the client process 404.

In another embodiment, the CPE 106 comprises a converged premises device (CPD), such as for example that described in co-owned U.S. patent application Ser. No. 11/378,129 filed Mar. 16, 2006 and entitled "METHODS AND APPARATUS FOR CENTRALIZED CONTENT AND DATA DELIVERY", which is now published as U.S. Patent Application Publication No. 2007/0217436, and patented as U.S. Pat. No. 8,347,341 on Jan. 1, 2013, is incorporated herein by reference in its entirety.

Moreover, the foregoing embodiments of the CPE 106 may utilize any number of other methods and apparatus in conjunction with the functionality previously described herein in order to further extend its capabilities. See, e.g., co-owned U.S. patent application Ser. No. 10/723,959 filed Nov. 24, 2003 entitled "METHODS AND APPARATUS FOR HARDWARE REGISTRATION IN A NETWORK DEVICE" which is now published as U.S. Patent Application Publication No. 2005/0114900, and patented as U.S. Pat. No. 8,302,111 on Oct. 30, 2012; U.S. patent application Ser. No. 10/773,664 filed Feb. 6, 2004 entitled "METHODS AND APPARATUS FOR DISPLAY ELEMENT MANAGEMENT IN AN INFORMATION NETWORK", and U.S. patent application Ser. No. 10/782,680 filed Feb. 18, 2004 entitled "MEDIA EXTENSION APPARATUS AND METHODS FOR USE IN AN INFORMATION NETWORK", which is now published as U.S. Patent Application Publication No. 2006/0036750, and patented as U.S. Pat. No. 8,078,669 on Dec. 13, 2011, and each of the foregoing incorporated herein by reference in its entirety. Myriad other combinations and variations of the CPE 106 will also be recognized by those of ordinary skill given the present disclosure.

It is noted that while a more traditional CPE 106 is described above with respect to the exemplary embodiment of FIG. 6, the CPE (and any client devices associated with the subscriber's premises or domain) may take on any number of different forms. For instance, in one variant, a personal computer (PC) or laptop of the type well known in the art acts as the "CPE" 106, including initiating requests for content download/delivery over a cable modem (e.g., DOCSIS) connection. An IP TV enabled device, for example, may request streaming of a content element encoded according to a prescribed format (e.g., RealVideo 10) and a prescribed DRM domain (e.g., WMDRM).

Similarly, a handheld portable device such as the exemplary Apple iPhone™ may interface with the network 101 via its indigenous WiFi capability (e.g., with a PC or other WiFi) gateway device that is coupled to the network so as to download video content meeting its capabilities. For instance, the aforementioned iPhone device currently may include support for inter alia: (i) H.264 video, up to 1.5 Mbps, 640 by 480 pixels, 30 frames per second, Low-Complexity version of the H.264 Baseline Profile with AAC-LC audio up to 160 Kbps, 48 kHz stereo audio in .m4v, .mp4, and .mov file formats; (ii) MPEG-4 video, up to 2.5 Mbps, 640 by 480 pixels, 30 frames per second, Simple Profile with AAC-LC audio up to 160 Kbps, 48 kHz, stereo audio in .m4v, .mp4, and .mov file formats, and so forth. Hence, information regarding these capabilities may be sent from the portable device to the CC 208 (indirectly) with the request for the content element, discovered by mechanisms such as those described with respect to FIG. 3D herein, etc.

In another variant, a cellular telephone or smartphone may be used to request delivery of a VOD session over a cellular network and gateway or portal between the MSO network and the cellular service provider network (e.g., a UMTS, 3GPP, GSM, PCS/DCS, etc. network). See, e.g., the methods and apparatus described in co-owned and co-pending U.S. patent application Ser. No. 11/258,229 filed Oct. 24, 2005 entitled "METHOD AND APPARATUS FOR ON-DEMAND CONTENT TRANSMISSION AND CONTROL OVER NET- WORKS", which is now published as U.S. Patent Application Publication No. 2007/0094691, is incorporated herein by reference in its entirety.

Myriad other types of client devices and CPE may be used consistent with the present invention, the foregoing being merely illustrative of the broader principles.

It will also be appreciated that the caching and de-caching methodologies and apparatus described herein may be readily adapted to other delivery paradigms where "stored" content is used. For example, within even a broadcast network, advertising and/or promotional content may be stored for subsequent use; e.g., splicing into a broadcast program stream such as that delivered over a traditional or broadcast switched architecture (BSA) network. Clearly, intelligent caching of such advertisements or promotions may be beneficial from the standpoint that caching space for such content is limited, and transcoding/transrating/transcryption of this content may be required as well, based on the device making the content request. The term "request" in this context may also refer to requests from a supervisory or control process (such as the Advertising and Promotional Content Selection Module (APCSM) described in co-owned and co-pending U.S. patent application Ser. No. 12/284,757 filed Sep. 26, 2007 entitled "METHODS AND APPARATUS FOR USER-BASED TARGETED CONTENT DELIVERY", which is now published as U.S. Patent Application Publication No. 2009/0187939, is incorporated herein by reference in its entirety). For example, the aforementioned APCSM may request a certain advertisement (based on e.g., its metadata) in a particular form for insertion into a program stream. If the advertisement is cached in the proper format, it may be served immediately. If not, it must be transformed from another format. Multiple requests for the same advertisement (albeit in different formats) may exist, such as where the advertisement is being inserted into multiple locations on different channels over the course of a day or evening.

Operational/Business Methods and "Rules" Engine—

In another aspect of the invention, the aforementioned process 402 of the CC 208 (e.g., rendered as one or more computer programs) optionally includes an operations and/or business rules engine. This engine comprises, in an exemplary embodiment, a series of software routines running on the network device 501 of FIG. 5 or other associated hardware/firmware environment that are adapted to control the operation of the content caching algorithms previously described. These rules may also be fully integrated within the CC process 402 itself, and controlled via e.g., a GUI on a PC connected to the network device 501 at the headend or a remote site. In effect, the rules engine comprises a supervisory entity which monitors and selectively controls, via the CC process 402 (and CPE process 404 if used), the content caching functions at a higher level, so as to implement desired operational or business rules.

The rules engine can be considered an overlay of sorts to the algorithms of the CC 402 previously described. For example, the CC process 402 may invoke certain operational protocols or decisions based on data received from the database 406 and optionally the CPE 106 (e.g., presence of cached versions within the storage volume, historical request or activity data, CPE configuration, logged errors, etc.), as well as network operational or historical data, demographic data, geographic data, etc. However, these caching decisions may not always be compatible with higher-level business or operational goals, such as maximizing profit on a network-wide basis (or after consideration of other factors not input to the CC caching algorithms, such as bandwidth availability, revenues from various delivery options, taxes, maintenance or repair costs, additional equipment leasing or use costs, subscription level considerations, etc.), or system reliability and/or flexibility. Moreover, the CC may be operating on a per-CPE or per-request basis (i.e., evaluating each individual request effectively in isolation, and generating a caching or de-caching decision or recommendation without considering larger patterns or decisions being made in the service group or network as a whole).

Hence, when imposed, the business/operational rules can be used to dynamically (or manually) control the operation of the CC process 402 (and client process 404 if used), in conjunction with the operational "recommendations" generated by the CC 402 as part of its content caching and de-caching functions previously described.

For example, one rule implemented by the rules engine may comprise consideration of revenue associated with various options. Content providers (e.g., studios, networks, etc.) might pay a premium or provide other incentives to the MSO to have particular content versions prioritized over others within the caching/de-caching logic. Such prioritization may be effected via, e.g., the condition codes previously described herein. For example, where a caching evaluation is performed based on a received request, the MSO may program its rules engine to select the more lucrative of the content versions (i.e., the one for which they receive greater payment or other consideration for using) if any. This may even be to the detriment of efficiency; i.e., it may be more efficient from a transformation asset (e.g., transcoder) or cache storage space perspective to choose a first version of a requested content element for caching, yet more lucrative to actually cache a second version (due to remuneration received by the MSO for doing so).

Similarly, a more incremental approach can be applied, such as where various content versions are "graded" based on profit/revenue and/or operational considerations (i.e., those which earn most and/or give highest user satisfaction, etc. receive a higher grade), and the caching decisions made at least to some degree based on such grade(s).

In a further variant, the MSO or network operator accepting consideration for offering a greater variety of versions of a given content element within the aforementioned caching architecture. As previously discussed, cache space is not unlimited, and hence the MSO must often make decisions relating to de-caching content. These decision processes may be impacted or skewed by the fact that certain content has a higher revenue or profit associated therewith. For example, a content provider (e.g., studio) may pay the MSO to maintain many different versions (i.e., different encoding, bitrate, encryption, etc.) cached so as to serve a broader variety of devices than might otherwise be served. Consider, for example, the exemplary Apple iPhone previously discussed, wherein Apple Inc. (or its agent) might pay an MSO to offer and maintain one or more versions of every content element offered that are particularly compatible or adapted for the iPhone (e.g., in terms of display resolution, bitrate, etc.), thereby ostensibly increasing iPhone user satisfaction by making content more readily available to such users.

In another embodiment, the rules engine considers any relative difference in effort or difficulty associated with selecting specific ones of the various caching options being evaluated by the CC 208; e.g., processing overhead, latency, detrimental effects or detractions from other attributes such as reduced bandwidth, storage space, increased cost (e.g., RTA costs, etc.), as part of the caching or de-caching decision or recommendation process. For example, if use of an HD-encoded variant consumes significantly more cache storage space than an SD variant of the same program, and hence precludes or reduces the flexibility or options in caching of other content, then this could be considered or weighed in the decision process. Use of the HD-encoded variant may statistically be more popular (and hence more likely to be used), but the detriments of caching the HD version may outweigh the benefits relating to statistical or anecdotal likelihood.

In another variant, methods and apparatus for optimizing network bandwidth utilization by delivering to users only the minimum number of programs required by service provider policies are employed in conjunction with the content caching policies described herein. See, e.g., the exemplary apparatus and method set forth in co-owned U.S. patent application Ser. No. 11/881,034 filed Jul. 24, 2007 entitled "METHODS AND APPARATUS FOR FORMAT SELECTION FOR NETWORK OPTIMIZATION", which is now published as U.S. Patent Application Publication No. 2009/0028182, and patented as U.S. Pat. No. 7,770,200 on Aug. 3, 2010,which is incorporated by reference herein in its entirety). These methods and apparatus are useful in, e.g., minimizing bandwidth consumption while also maximizing subscriber satisfaction and service level (e.g., video and/or audio quality), especially when programming consumption changes drastically. In one exemplary embodiment, a "forced delivery" approach is employed, wherein a certain type or version of content is selected and delivered. For example, a given program may be available in both a standard definition (SD) format and high definition (HD) format. In times of constrained bandwidth, the SD version of a program may be delivered when an HD program is requested. If the user's CPE has upconversion capability, the user may still advantageously experience "HD-quality" video, even though the CPE input has been switched to SD. In other embodiments, up-rating or down-rating of one or more program streams (i.e., changing the bitrate up or down) can be used to temporarily or even indefinitely accommodate periods of increased or reduced network capacity, respectively. This "trans-rating" may be accomplished dynamically and according to any number of different implementation schemes.

As another example, the failure of a network component, or loss of a content source, might render certain options unachievable (or at least undesirable due to factors such as high cost burden, high delivery latency, poor video quality, etc.). Hence, the rules engine can in such cases be used to mask the affected options or inputs to the CC algorithm during the affected periods of time.

It will also be appreciated that the decisions generated by the CC caching and/or de-caching analyses can be manually or semi-manually utilized by network operators, such as in the form of a recommendation rather than a hard and fast decision point. For instance, the CC 208 may present a recommended course of action to a human operator (e.g., via a GUI on a PC communicating with the CC network process 402), thereby letting the operator decide whether to implement it. This variant of the invention allows for the intangible but often important "gut feeling" or intrinsic knowledge of the operator to be factored into the decision process. The operator may also be able to identify trends or patterns in network operation that the CC 208 or rules engine cannot, such as the topical popularity of a given program, in effect allowing the operator to override the CC's logic when his/her knowledge or intuition says that a different course should be followed.

Enforcement of the foregoing business or operational rules may be executed by servers or other devices separately for each service (e.g. BSA or VoD) or centrally via the controlling actions of a master CC 208, GSRM (Session and Resource Manager) or other network agent.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

APPENDIX I—Exemplary GSRM to Transcoder/Transrater Protocol

© Copyright 2007 Time Warner Cable, Inc. All Rights Reserved

Session Create

```
Body
    <s:Envelope xmlns:s="twc-ceni">
        <s:Header>
            <msg:TCRSessionCreate version="1.0">
                <to>            transcoder/rater ID    </to>
                <from>          gsrm ID                </from>
            </msg:TCRSessionCreate>
        </s:Header>
        <s:Body>
            <sessionId>     unique session Id       </sessionId>
            <inputIP>       source IP               </inputIP>
            <inputPort>     source UDP Port         </inputPort>
            <inputProg>     input Program Number    </inputProg>
            <inputSrcId>    input Source ID         </inputSrcId>
            <outputIP>      destination IP          </outputIP>
            <outputPort>    destination UDP Port    </outputPort>
            <outputTSID>    stream Transport ID     </outputTSID>
            <sessionRate>   session bit-rate        </sessionRate>
            <transGOP>      output GOP size         </transGOP>
            <transVid>      output video CODEC      </transVid>
            <transAud>      output audio CODEC      </transAud>
            <transHoriz>    output horizontal res   </transHoriz>
            <transVert>     output vertical res     </transVert>
            <transRate>     output bit-rate         </transRate>
            <transMeter>    output CBR/VBR          </transMeter>
            <transScan>     output prog/inter       </transScan>
            <transTrans>    output transport pack   </transTrans>
        </s:Body>
    </s:Envelope>
``` transcoder/transrater ID: ID represents a unique identification for the transcoder/transrater receiving the session create message gsrm ID: ID represents a unique identification for the GSRM sending the session create message create session: indicates a create session request unique session Id: provides a unique identification for the session being created, provides a reference for queries and deletes source IP: represents source IP address for the incoming stream, the stream arriving from the source will be targeted for this IP address source UDP Port: represents source UDP Port for the incoming stream, the stream arriving from the source will be targeted for this Port input Program Number: indicates the input stream MPEG program number destination IP: represents the destination IP (or next hop IP) for the outgoing stream destination UDP Port: represents destination UDP Port (or next hop Port) for the outgoing stream stream Transport ID: indicates the Transport Stream ID for the outgoing stream session bit-rate: indicates the bit-rate of session being created for the incoming video stream (if known)

output GOP size: indicates the GOP size (I-frame/IDR interval) of outputted video stream output video CODEC: indicates the video CODEC for the output video stream, valid settings are as follows:
Pass-through (no transcode)
MPEG-2
AVC-H.264
VC-1 output audio CODEC: indicates the audio CODEC for the output audio stream. In the event of multiple audio streams, the following settings should be applied to all. The valid settings are as follows:
Pass-through (no transcode)
MP3 (mpeg-1 layer 3)
MPEG-2
AC3
AC3+
AAC
AAC+ output horizontal resolution: indicates the horizontal resolution of the output video stream output vertical resolution: indicates the vertical resolution of the output video stream output stream bit-rate: indicates the overall bit rate of the transport stream, in the case of VBR indicates the cap bit-rate output video bit-rate: indicates the allowable bit-rate of the video stream, in the case of VBR indicates the cap bit-rate output audio bit-rate: indicates the allowable bit-rate of the audio stream(s), in the case of VBR indicates the cap bit-rate output CBR/VBR: indicates whether the transport video stream is to be encoded as constant bit-rate (CBR) or variable bit-rate (VBR)

output progressive/interlaced: indicates whether the frames should be encoded for interlaced or progressive (non-interlaced) output.

output transport packet type: indicates the of transport packet type (i.e. "wrapper") to be used for encapsulating the elementary streams. The valid settings are as follows:
MPEG-2 Transport Stream
RTP Transport
3GP Transport Session Create Confirm

```
Body
    <s:Envelope xmlns:s="twc-ceni">
        <s:Header>
            <msg:TCRSessionCreateConfirm version="1.0">
                <to>         gsrm ID                      </to>
                <from>       transcoder/rater ID          </from>
            </msg:TCRSessionCreateConfirm>
        </s:Header>
        <s:Body>
            <sessionId>      unique session Id    </sessionId>
            <errorMsg>       error messages       </errorMsg>
        </s:Body>
    </s:Envelope>
``` gsrm ID: ID represents a unique identification for the GSRM that sent the session create message transcoder/rater ID: ID represents a unique identification for the transcoder/transrater that received the session create message confirm create: indicates a confirmation for the create session request (whether successful or not)

unique session Id: provides a unique identification for the session being created, provides a reference for queries and deletes error messages: in the event of an error in the session create, the network encrypter can return an error message based on pre-defined error codes (see Appendix 1). In addition, the NE can send a more verbose message based on the log level setting to help with assist with error determination.

Session Query

```
Body
    <s:Envelope xmlns:s="twc-ceni">
        <s:Header>
            <msg:TCRSessionQuery version="1.0">
                <to>         transcoder/rater ID    </to>
                <from>       gsrm ID                </from>
            </msg:TCRessionQuery>
        </s:Header>
        <s:Body>
            <sessionId>      unique session Id    </sessionId>
        </s:Body>
    </s:Envelope>
``` transcoder/rater ID: ID represents a unique identification for the transcoder/transrater receiving the session create message gsrm ID: ID represents a unique identification for the GSRM sending the session create message query session: indicates a request for a query on the session unique session Id: provides a unique identification for the session created; provides a reference for queries and deletes Session Query Confirm

```
Body
    <s:Envelope xmlns:s="twc-ceni">
        <s:Header>
            <msg:TCRSessionQueryConfirm version="1.0">
                <to>         gsrm ID                      </to>
```

-continued

```
        <from>      transcoder/rater ID      </from>
        </msg:TCRSessionQueryConfirm>
    </s:Header>
    <s:Body>
        <sessionId>     unique session Id    </sessionId>
        <inputIP>       source IP            </inputIP>
        <inputPort>     source UDP Port      </inputPort>
        <inputProg>     input Program Number </inputProg>
        <inputSrcId>    input Source ID      </inputSrcId>
        <outputIP>      destination IP       </outputIP>
        <outputPort>    destination UDP Port </outputPort>
        <outputTSID>    stream Transport ID  </outputTSID>
        <sessionRate>   session bit-rate     </sessionRate>
        <transGOP>      output GOP size      </transGOP>
        <transVid>      output video CODEC   </transVid>
        <transAud>           output audio CODEC   </transAud>
        <transHoriz>         output horizontal res </transHoriz>
        <transVert>          output vertical res   </transVert>
        <transRate>          output bit-rate       </transRate>
        <transMeter>         output CBR/VBR        </transMeter>
        <transScan>          output prog/inter     </transScan>
        <transTrans>         output transport pack </transTrans>
        <errorMsg>           error messages        </errorMsg>
    </s:Body>
</s:Envelope>
```

Session Delete

Body
```
<s:Envelope xmlns:s="twc-ceni">
    <s:Header>
        <msg:TCRSessionDelete version="1.0">
            <to>       transcoder/rater ID   </to>
            <from>     gsrm ID               </from>
        </msg:TCRSessionDelete>
    </s:Header>
    <s:Body>
        <sessionId>    unique session Id     </sessionId>
    </s:Body>
</s:Envelope>
```

Session Delete Confirm

Body
```
<s:Envelope xmlns:s="twc-ceni">
    <s:Header>
        <msg:TCRSessionDeleteConfirm version="1.0">
            <to>       gsrm ID               </to>
            <from>     transcoder/rater ID   </from>
        </msg:TCRSessionDeleteConfirm>
    </s:Header>
    <s:Body>
        <sessionId>    unique session Id     </sessionId>
        <errorMsg>     error messages        </errorMsg>
    </s:Body>
</s:Envelope>
```

APPENDIX II—Exemplary Session Setup Message Definitions

© Copyright 2007 Time Warner Cable, Inc. All Rights Reserved

ClientSessionSetupRequest—

An extension to this message is required to provide the capabilities of the STB:
1) Video Decoding Types
2) Audio Decoding Types
3) Network Transport Types
4) Conditional Access Types
5) Network Interface Types
6) Video Decoder Parameters, including:
7) Resolution
8) Frame Rate
9) Scan Type The following table outlines the additional syntax to the ClientSessionSetupRequest message.

TABLE II-1

Exemplary DSM-CC U-N ClientSessionSetUpRequest message

| Field Name | Length (Bytes) |
|---|---|
| ClientSessionSetUpRequest( ) { | |
|   dsmccMessageHeader( ) | |
|   sessionId | |
|   reserved | 10 |
|   clientId | 2 |
|   serverId | 20 |
|   userData( | 20 |
|     uuData( | |
|       privateData( ) | |
|       clientAttributes( ) | Variable |
|     ) | 10 |
|   ) | |
| } | |

The sessionId is used to identify a session throughout its life cycle. If the Network configuration indicates that the User which is the originator of the command sequence is responsible for generating the sessionId, this field is generated by the Client. If the Network configuration indicates that the Network is responsible for generating the sessionId, this field is set to all 0's and the Network shall assign the sessionId in the ClientSessionSetUpConfim message. Both the Network and the Client use the identical sessionId in all messages which refer to this session.

The clientId field is set by the Client and contains a value which uniquely identifies the Client within the domain of the Network.

The serverId field is set by the Client and contains a value which uniquely identifies the Server with the Client is attempting to establish a session.

The UserData( ) structure contains the uuData which is defined by the User-To-User portion of this specification and privateData.

TABLE II-2

Exemplary UUData format

| Syntax | Data Type |
|---|---|
| UUData { | |
|     ProtocolID | unsigned integer8 |
|     Version | unsigned integer8 |
|     ServiceGateway | character[16] |
|     ServiceGatewayDataLength | unsigned integer32 |
|     for (ServiceGatewayDataLength) | |
|     { | |
|         Service | character[16] |
|         ServiceDataLength | unsigned integer32 |
|         for | |
|         (ServiceDataLength) { | |
|             ServiceData | byte[ServiceDataLength] |
|         } | |
|     } | |
| } | |
| ClientAttributesDataLength | unsigned integer8 |
| for (ClientAttributesDataLength){ | |
|     clientAttributes | byte[ClientAttributesDataLength] |
| } | |
| } | |

Pegasus SSP messages are sent to the SRM and include the NSAP address of an ISA Session Gateway. In legacy implementations of the SSP, the Session Gateway was the end point of SSP messages and was usually included in the application server.

clientAtttributes( )—Resource descriptor containing the following attributes:

1) VideoDecodeType—List of Video CODECs supported by device (e.g. MPEG2, AVC, VC-1)

2) AudioDecodeType—List of Audio CODECs supported by device (e.g. AC3, AC3+, AAC+, MP2, MP3, etc)

3) TransportType—Indicates the type of video transport to use for video/audio streams (e.g. MPEG-2 TS, RTP, etc)

4) ConditionalAccessType—List of Conditional Access technologies supported by device (e.g. PowerKEY, MediaCipher, NDS, etc)

5) NetworkintetfaceType—List of Network Interfaces supported for receiving video stream (e.g. QAM, 10/100 Ethernet, CDMA, GSM, etc)

6) PictureResolution—Max picture resolution that device can display

7) FrameRate—List of the max Frame Rates supported by device

8) VideoScanType—List of scan types supported by device (e.g. Interlaced or Progressive)

The ResourceDescriptor fields are assigned by the Client. The number and type of resource descriptors that are passed depend on the User application and the type of service being requested.

The ClientCapabilities resource descriptor is originated by the Client to indicate to the Network the video/audio stream decoding, conditional access (CA), network interface and video resolution capabilities of the Client. When the Network receives this resource in a ClientSessionSetupRequest message from the Client, then the Network may utilize this date to determine the appropriate attributes of the stream to send toward the client. The following table defines the format of the ClientCapabilities descriptor.

TABLE II-3

ClientCapabilities data fields

| Field Name | Encoding | Variable | Length (Bits) |
|---|---|---|---|
| VideoDecodeType | S | No | 12 |
| AudioDecodeType | S | No | 12 |
| ConditionalAccessType | S | No | 12 |
| NetworkInterfaceType | S | No | 12 |
| Transport Protocol Type | S | No | 6 |
| VideoResolution | S | No | 10 |
| Aspect Ratio | S | No | 3 |
| FrameRate | S | No | 4 |
| VideoScanType | S | No | 2 |
| Reserved | S | No | 7 |
| | | Total (Bits) | 80 |
| | | Total (Bytes) | 10 |

The VideoDecodeType field is used to indicate the ability of a given client to process a particular video stream type (e.g. MPEG2, H.264, etc). The Network is responsible for using this value to establish, manage and route a stream of the proper encoding to the client.
    (000000000000) 0=Reserved
    (000000000001) 1=MPEG-2 (Default)
    (000000000010) 2=AVC/H.264
    (000000000100) 4=VC-1
    (000000001000) 8=Real Helix
    (000000010000) 16=Flash/H.263
    (000000100000) 32=Not Defined
    (000001000000) 64=Not Defined
    (000010000000) 128=Not Defined
    (1) 2048=Reserved The AudioDecodeType field is used to indicate the ability of a given client to process a particular audio stream type (e.g. AC3, AC3+, AAC, etc). The Network is responsible for using this value to establish, manage and route a stream of the proper encoding to the client.
    (000000000000) 0=Reserved
    (000000000001) 1=MPEG-2
    (000000000010) 2=AAC/AAC+
    (000000000100) 4=AC3/AC3+ (Dolby Digital Plus) (Default)
    (000000001000) 8=Real
    (000000010000) 16=WMA
    (000000100000) 32=MP3
    (000001000000) 64=Reserved
    (000010000000) 128=Reserved
    (100000000000) 2048=Reserved The ConditionalAccessType field is used to indicate the ability of a given client to process streams encrypted using a particular type of Conditional Access (e.g. PowerKEY, MediaCipher, NDS, etc). The Network is responsible for using this value to establish, manage and route a stream of the proper encoding to the client.
    (000000000000) 0=Reserved
    (000000000001) 1=PowerKEY
    (000000000010) 2=MediaCiper
    (000000000100) 4=NDS
    (000000001000) 8=Reserved
    (000000010000) 16=Reserved
    (000000100000) 32=Reserved
    (000001000000) 64=Reserved
    (000010000000) 128=Reserved
    (100000000000) 2048=Reserved The NetworkInterfaceType field is used to indicate the ability of a given client to receive video/audio streams via given network interface/protocol and type (e.g. QAM, DOC- SIS, CDMA, GSM, MOCA, etc). The stream route may be determined on a per session basis. The Network is responsible for using this value to establish, manage and route a stream of the proper encoding to the client.

(000000000000) 0=Reserved
    (000000000001) 1=QAM (Default)
    (000000000010) 2=DOCSIS
    (000000000100) 4=Ethernet (10/100/1000)
    (000000001000) 8=WiFi (802.11x)
    (000000010000) 16=MOCA
    (000000100000) 32=CDMA/3G
    (000001000000) 64=GSM/GPRS
    (000010000000) 128=Reserved
    (100000000000) 2048=Reserved The TransporiProtocolType field is a 8-bit mask that is used to indicate the transport wrapper used for the MPEG streams (00000000) 0=Reserved
    (00000001) 1=MPEG-2 TS (Default)
    (00000010) 2=RTP
    (00000100) 4=3GP
    (00001000) 8=Reserved
    (10000000) 128=Reserved The VideoResolution is a 10-bit unsigned integer field that indicates the vertical size in units of 8 pixels. Typical range is 12 to 288. Values 0 and 1023 are reserved. The field is in units of 8 pixels. For example, 60 means 480 pixels, 90 means 720 pixels and 135 means 1080 pixels. Also possible is 12 meaning 96 pixels (SQCIF), for example, for future implementation.

The AspectRatio is a 3-bit unsigned integer field
    (0000) 0=Reserved
    (0001) 1=4:3 (Default)
    (0010) 2=16:9
    (0011) 3=Reserved
    (0100) 4=Reserved
    (0101) 5=Reserved
    (0110) 6=Reserved
    (0111) 7=Reserved The FrameRate is a 4-bit unsigned integer field indicates the frame rate.
    (0000) 0=Reserved
    (0001) 1=12 Hz
    (0010) 2=15 Hz
    (0011) 3=23.976 Hz
    (0100) 4=24 Hz
    (0101) 5=29.97 Hz
    (0110) 6=30 Hz
    (0111) 7=59.94 Hz
    (1000) 8=60 Hz
    (1001) 9=Reserved
    (1111) 15=Reserved The VideoScanType is an 2-bit unsigned integer field shall indicate the scan type. 1 is progressive, 2 is interlaced. Values 0 and 3 are reserved.
    (00) 0=Reserved
    (01) 1=Progressive
    (10) 2=Interlaced (Default)
    (11) 3=Reserved

What is claimed is:

1. A computer readable apparatus comprising a storage medium configured to store a plurality of instructions thereon, said plurality of instructions configured to, when executed:
    recognize receipt of a plurality of content in a first format from a content source;
    receive a plurality of requests for individual ones of said plurality of content in at least one second format from individual ones of a plurality of users;
    evaluate said plurality of requests to generate predictions of future demands for said individual ones of said plurality of content in at least one second format;
    when a prediction for at least one of said individual ones of said plurality of content in at least one second format reaches a predetermined threshold, cache said at least one of said individual ones of said plurality of content in said at least one second format; and
    provide said at least one of said individual ones of said plurality of content in said at least one second format to said individual ones of said plurality of users.

2. The apparatus of claim 1, wherein said evaluation of said plurality of requests to generate predictions of future demands for said individual ones of said plurality of content in at least one second format is based at least in part on an association of said individual ones of said plurality of users with historical viewing habits.

3. The apparatus of claim 1, wherein said plurality of instructions are further configured to, when executed, obtain profile data for individual ones of said plurality of users.

4. The apparatus of claim 3, wherein said generation of said predictions of future demands for said individual ones of said plurality of content is based at least in part on profile data for individual ones of said plurality of users.

5. The apparatus of claim 1, wherein said evaluation of said plurality of requests to generate predictions of future demands for said individual ones of said plurality of content further comprises a use of a data structure to identify various content elements associated with said individual ones of said plurality of content.

6. The apparatus of claim 5, wherein said data structure further comprises an algorithmic scheme configured to generate predictions based at least in part on an aggregated probability which associates said various content elements with said individual ones of said plurality of content.

7. The apparatus of claim 1, wherein said evaluation of said plurality of requests to generate predictions of future demands for said individual ones of said plurality of content is based at least in part on a date and/or a time of day.

8. A method of providing cached content in a network, said method comprising:
    receiving content in a first format from a content source;
    receiving requests for said content in at least one second format;
    evaluating said received requests to generate a prediction of future demand for said content in at least one second format; and
    when said prediction for said content in at least one second format reaches a predetermined threshold, caching said content in said at least one second format.

9. The method of claim 8, wherein said prediction of future demand is based at least in part on a frequency of said received requests.

10. The method of claim 8, wherein said prediction of future demand is based at least in part on projected bandwidth demands.

11. The method of claim 10, wherein said projected bandwidth demands are based at least in part on an anticipated popularity level of said content based on one or more of: advertising, word of mouth, a time of day, a day of week, and/or an event relevant to said content.

12. The method of claim 8, further comprising:
    determining a plurality of time periods based at least in part on said prediction of future demand for said content in at least one second format, a first one of said plurality of time periods comprising a time period within which said content is cached, and a second one of said plurality of time periods comprising a time period within which said content is not cached, said first and second ones of said plurality of time periods not overlapping; and updating a record based at least in part on said prediction of future demand with respect to said content in at least one second format, said record indicating one of said plurality of time periods associated thereto.

13. The method of claim 8, further comprising transforming said content in said first format to said content in said at least one second format prior to said act of caching, said act of transforming comprising one or more of: transcoding, transrating, and/or transcryption.

14. The method of claim 8, further comprising providing said content in said at least one second format to a user.

15. An apparatus configured to cache content in a network, said apparatus comprising:
- a processor; and
- at least one computer program operative to run on said processor, said computer program comprising a plurality of instructions which are configured to, when executed, cause said apparatus to:
  - receive a plurality of content in a first format from a content source;
  - receive a plurality of requests for individual ones of a plurality of content rendered in at least one second format from individual ones of a plurality of users;
  - utilize said plurality of requests to determine a predicted pattern of behavior with respect to said individual ones of said plurality of content rendered in said at least one second format; and
  - cache at least one of said individual ones of said plurality of content in said at least one second format, based at least in part on said predicted pattern of behavior.

16. The apparatus of claim 15, wherein said plurality of instructions are further configured to, when executed, cause said apparatus to determine that a prediction reaches a predetermined threshold.

17. The apparatus of claim 15, wherein said plurality of instructions are further configured to, when executed, cause said apparatus to re-encode said individual ones of said plurality of video content from said first format to said at least one second format prior to said cache thereof.

18. The apparatus of claim 15, wherein said cache of said at least one of said individual ones of said plurality of content is based at least in part on a caching capacity and a transcoding efficiency.

19. The apparatus of claim 15, wherein said plurality of instructions are further configured to, when executed, cause said apparatus to determine whether to cache said content based at least in part on an identification of duplications of said requests for said content.

20. The apparatus of claim 15, wherein said predicted pattern of behavior is based at least in part on an association of said individual ones of said plurality of users with geographic data.

* * * * *